US012679190B2

(12) United States Patent
Wheeler et al.

(10) Patent No.: US 12,679,190 B2
(45) Date of Patent: Jul. 14, 2026

(54) CHASSIS WITH STRUCTURAL BATTERY COMPARTMENT

(71) Applicant: Oshkosh Corporation, Oshkosh, WI (US)

(72) Inventors: Colin Wheeler, Oshkosh, WI (US); Christopher Yakes, Oshkosh, WI (US); Jeremy Andringa, Oshkosh, WI (US); Erik S. Ellifson, Oshkosh, WI (US); Ryan Wolf, Oshkosh, WI (US); Martin J. Schimke, Red Granite, WI (US); Chad Smith, Omro, WI (US); Peter Kramer, Oshkosh, WI (US); Nader Nasr, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 554 days.

(21) Appl. No.: 17/940,364

(22) Filed: Sep. 8, 2022

(65) Prior Publication Data

US 2023/0070279 A1 Mar. 9, 2023

Related U.S. Application Data

(60) Provisional application No. 63/242,317, filed on Sep. 9, 2021, provisional application No. 63/242,304, filed on Sep. 9, 2021.

(51) Int. Cl.
*B60K 1/04* (2019.01)
*B60L 50/60* (2019.01)
(Continued)

(52) U.S. Cl.
CPC ................. *B60K 1/04* (2013.01); *B60L 50/66* (2019.02); *B60L 58/18* (2019.02); (Continued)

(58) Field of Classification Search
CPC .............. B60K 1/04; B60K 2001/0416; B60K 2001/0438; B60K 1/00; B60K 2001/0461; (Continued)

(56) References Cited

U.S. PATENT DOCUMENTS

| 7,520,355 B2 * | 4/2009 | Chaney | .................... B60K 1/04 |
| | | | 280/783 |
| 9,381,822 B2 * | 7/2016 | Scheucher | .............. B60L 53/20 |

(Continued)

FOREIGN PATENT DOCUMENTS

| CA | 3213980 A1 | 1/2023 | |
| GB | 2570870 A * | 8/2019 | .............. B60L 53/80 |
| WO | WO-2021/035298 A1 | 3/2021 | |

OTHER PUBLICATIONS

Office Action issued in connection with Canada Appl. No. 3173736 dated Nov. 27, 2023.

(Continued)

*Primary Examiner* — Steve Clemmons
(74) *Attorney, Agent, or Firm* — Foley & Lardner LLP

(57) ABSTRACT

An electrified vehicle includes a chassis, a body, and a cab. The chassis is configured to support a tractive element. The chassis includes a battery box. The body is supported by the chassis. The cab is supported by the chassis. The battery box includes a shell defining an internal cavity. The battery box is configured to receive a module. The module comprises a battery and a module terminal. The battery box is configured to transfer energy from the module to a component of the vehicle. The internal cavity of the battery box comprises a system terminal configured to contact the module terminal of the module to facilitate the transfer of the energy from the module to a component of the vehicle.

20 Claims, 25 Drawing Sheets

(51) Int. Cl.

| | |
|---|---|
| *B60L 58/18* | (2019.01) |
| *H01M 10/44* | (2006.01) |
| *H01M 10/625* | (2014.01) |
| *H01M 50/204* | (2021.01) |
| *H01M 50/24* | (2021.01) |
| *H01M 50/242* | (2021.01) |
| *H01M 50/249* | (2021.01) |
| *H01M 50/296* | (2021.01) |

(52) U.S. Cl.
CPC ....... *H01M 10/441* (2013.01); *H01M 10/625* (2015.04); *H01M 50/204* (2021.01); *H01M 50/24* (2021.01); *H01M 50/242* (2021.01); *H01M 50/249* (2021.01); *H01M 50/296* (2021.01); *B60K 2001/0416* (2013.01); *B60K 2001/0438* (2013.01); *H01M 2220/20* (2013.01)

(58) Field of Classification Search
CPC . B60K 2001/0494; B60L 50/66; B60L 58/18; B60L 50/60; B60L 2200/44; B60L 53/80; B60L 2200/40; H01M 10/441; H01M 10/625; H01M 50/204; H01M 50/24; H01M 50/242; H01M 50/249; H01M 50/296; H01M 2220/20; H01M 10/613; H01M 10/6556; H01M 10/6563; A62C 27/00; B60Y 2200/142; B60Y 2200/144; B60Y 2200/49; Y02T 10/70
See application file for complete search history.

(56) References Cited

U.S. PATENT DOCUMENTS

| | | | |
|---|---|---|---|
| 10,343,629 B2 * | 7/2019 | Makke | B60R 16/03 |
| 10,562,403 B2 * | 2/2020 | Falconer | B60L 50/64 |
| 11,046,192 B2 * | 6/2021 | Aufdencamp | B60L 50/60 |
| 11,485,215 B1 | 11/2022 | Willison et al. | |
| 11,498,435 B2 * | 11/2022 | Hebert | B60K 17/22 |
| 11,548,361 B2 * | 1/2023 | Arana | B60K 1/04 |
| 11,894,533 B2 * | 2/2024 | Menon | H01M 10/625 |
| 2002/0071336 A1 | 6/2002 | Smith et al. | |
| 2002/0103580 A1 | 8/2002 | Yakes et al. | |
| 2003/0158638 A1 | 8/2003 | Yakes et al. | |
| 2003/0205422 A1 | 11/2003 | Morrow et al. | |
| 2003/0209375 A1 * | 11/2003 | Suzuki | B60L 58/25 |
| | | | 180/68.5 |
| 2004/0133332 A1 | 7/2004 | Yakes et al. | |
| 2004/0245039 A1 | 12/2004 | Braun et al. | |
| 2005/0113988 A1 | 5/2005 | Nasr et al. | |
| 2005/0119806 A1 | 6/2005 | Nasr et al. | |
| 2005/0209747 A1 | 9/2005 | Yakes et al. | |
| 2006/0065451 A1 | 3/2006 | Morrow et al. | |
| 2006/0066109 A1 | 3/2006 | Nasr | |
| 2006/0070776 A1 | 4/2006 | Morrow et al. | |
| 2006/0070788 A1 | 4/2006 | Schimke | |
| 2006/0106521 A1 | 5/2006 | Nasr et al. | |
| 2006/0249325 A1 | 11/2006 | Braun et al. | |
| 2007/0088469 A1 | 4/2007 | Schmiedel et al. | |
| 2007/0288131 A1 | 12/2007 | Yakes et al. | |
| 2007/0291130 A1 | 12/2007 | Broggi et al. | |
| 2008/0059014 A1 | 3/2008 | Nasr et al. | |
| 2008/0065285 A1 | 3/2008 | Yakes et al. | |
| 2008/0071438 A1 | 3/2008 | Nasr et al. | |
| 2008/0150350 A1 | 6/2008 | Morrow et al. | |
| 2009/0033044 A1 | 2/2009 | Linsmeier | |
| 2009/0079839 A1 | 3/2009 | Fischer et al. | |
| 2009/0088283 A1 | 4/2009 | Schimke | |
| 2009/0127010 A1 | 5/2009 | Morrow et al. | |
| 2009/0194347 A1 | 8/2009 | Morrow et al. | |
| 2010/0116569 A1 | 5/2010 | Morrow et al. | |
| 2010/0301668 A1 | 12/2010 | Yakes et al. | |
| 2011/0045930 A1 | 2/2011 | Schimke | |
| 2011/0312459 A1 | 12/2011 | Morrow et al. | |

| | | | |
|---|---|---|---|
| 2012/0049470 A1 | 3/2012 | Rositch et al. | |
| 2012/0098215 A1 | 4/2012 | Rositch et al. | |
| 2012/0125702 A1 * | 5/2012 | Bergfjord | B60K 1/04 |
| | | | 429/163 |
| 2012/0143430 A1 | 6/2012 | Broggi et al. | |
| 2012/0234638 A1 | 9/2012 | Ellifson et al. | |
| 2013/0196806 A1 | 8/2013 | Morrow et al. | |
| 2013/0206496 A1 * | 8/2013 | Hashimoto | B62D 21/12 |
| | | | 180/291 |
| 2013/0249175 A1 | 9/2013 | Ellifson | |
| 2013/0249183 A1 | 9/2013 | Ellifson et al. | |
| 2013/0264784 A1 | 10/2013 | Venton-Walters et al. | |
| 2013/0300073 A1 | 11/2013 | Venton-Walters et al. | |
| 2014/0251742 A1 | 9/2014 | Dillman et al. | |
| 2014/0291945 A1 | 10/2014 | Venton-Walters et al. | |
| 2014/0326555 A1 | 11/2014 | Ellifson et al. | |
| 2014/0334956 A1 | 11/2014 | Venton-Walters et al. | |
| 2015/0028529 A1 | 1/2015 | Ellifson | |
| 2015/0151651 A1 | 6/2015 | Stingle et al. | |
| 2015/0197129 A1 | 7/2015 | Venton-Walters et al. | |
| 2015/0283894 A1 | 10/2015 | Morrow et al. | |
| 2015/0290993 A1 | 10/2015 | Dillman et al. | |
| 2015/0377314 A1 | 12/2015 | Ellifson et al. | |
| 2016/0001765 A1 | 1/2016 | Shukla et al. | |
| 2016/0144211 A1 | 5/2016 | Betz et al. | |
| 2016/0167475 A1 | 6/2016 | Ellifson et al. | |
| 2016/0208883 A1 | 7/2016 | Dillman et al. | |
| 2016/0297417 A1 | 10/2016 | Shukla et al. | |
| 2016/0361987 A1 | 12/2016 | Morrow et al. | |
| 2017/0008507 A1 | 1/2017 | Shukla et al. | |
| 2017/0253221 A1 | 9/2017 | Verhoff et al. | |
| 2017/0282670 A1 | 10/2017 | Venton-Walters et al. | |
| 2017/0361491 A1 | 12/2017 | Datema et al. | |
| 2017/0361492 A1 | 12/2017 | Datema et al. | |
| 2018/0003258 A1 | 1/2018 | Ellifson et al. | |
| 2018/0056746 A1 | 3/2018 | Ellifson et al. | |
| 2018/0072303 A1 | 3/2018 | Shukla et al. | |
| 2018/0222484 A1 | 8/2018 | Shively et al. | |
| 2018/0229569 A1 | 8/2018 | Dillman et al. | |
| 2018/0335104 A1 | 11/2018 | Dillman et al. | |
| 2018/0345783 A1 | 12/2018 | Morrow et al. | |
| 2019/0039407 A1 | 2/2019 | Smith | |
| 2019/0160972 A1 * | 5/2019 | Zeiler | H01M 10/441 |
| 2019/0178329 A1 | 6/2019 | Dumitru et al. | |
| 2019/0185077 A1 | 6/2019 | Smith et al. | |
| 2019/0276102 A1 | 9/2019 | Zuleger et al. | |
| 2019/0291560 A1 * | 9/2019 | Lampsa | B60L 53/14 |
| 2019/0291711 A1 | 9/2019 | Shukla et al. | |
| 2019/0308480 A1 | 10/2019 | Dillman et al. | |
| 2019/0316650 A1 | 10/2019 | Dillman et al. | |
| 2019/0337348 A1 | 11/2019 | Venton-Walters et al. | |
| 2019/0337350 A1 | 11/2019 | Ellifson et al. | |
| 2019/0338823 A1 | 11/2019 | Ellifson et al. | |
| 2019/0344475 A1 | 11/2019 | Datema et al. | |
| 2019/0351883 A1 | 11/2019 | Verhoff et al. | |
| 2019/0381990 A1 | 12/2019 | Shukla et al. | |
| 2020/0039341 A1 | 2/2020 | Morrow et al. | |
| 2020/0139804 A1 | 5/2020 | Holmes et al. | |
| 2020/0148073 A1 * | 5/2020 | Sasu | B60L 58/27 |
| 2020/0223276 A1 | 7/2020 | Rositch et al. | |
| 2020/0232533 A1 | 7/2020 | Dillman et al. | |
| 2020/0254840 A1 | 8/2020 | Rositch et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2020/0316816 A1 | 10/2020 | Messina et al. | |
| 2020/0317083 A1 | 10/2020 | Messina et al. | |
| 2020/0335840 A1 * | 10/2020 | Sloan | B60K 1/04 |
| 2020/0346547 A1 | 11/2020 | Rocholl et al. | |
| 2020/0346556 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |

(56) References Cited

U.S. PATENT DOCUMENTS

| | | |
|---|---|---|
| 2020/0347659 A1 | 11/2020 | Rocholl et al. |
| 2020/0358150 A1* | 11/2020 | Fields .................. H01M 10/65 |
| 2020/0398670 A1 | 12/2020 | Rocholl et al. |
| 2020/0398695 A1 | 12/2020 | Rocholl et al. |
| 2020/0399107 A1 | 12/2020 | Buege et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0070595 A1 | 3/2021 | Holmes et al. |
| 2021/0088036 A1 | 3/2021 | Schubart et al. |
| 2021/0101463 A1 | 4/2021 | Matsushima et al. |
| 2021/0101464 A1 | 4/2021 | Matsushima et al. |
| 2021/0101641 A1 | 4/2021 | Kim et al. |
| 2021/0155063 A1 | 5/2021 | Rositch et al. |
| 2021/0171137 A1 | 6/2021 | Zuleger et al. |
| 2021/0178879 A1 | 6/2021 | Swartzell et al. |
| 2021/0188076 A1 | 6/2021 | Morrow et al. |
| 2021/0213642 A1 | 7/2021 | Datema et al. |
| 2021/0221216 A1 | 7/2021 | Yakes et al. |
| 2021/0229515 A1 | 7/2021 | Dillman et al. |
| 2021/0245809 A1 | 8/2021 | Saje et al. |
| 2021/0276415 A1 | 9/2021 | Schimke et al. |
| 2021/0276455 A1 | 9/2021 | David et al. |
| 2021/0276643 A1 | 9/2021 | Ellifson et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0323763 A1 | 10/2021 | Koga et al. |
| 2021/0323764 A1 | 10/2021 | Koga et al. |
| 2021/0323765 A1 | 10/2021 | Koga et al. |
| 2021/0325529 A1 | 10/2021 | Koga et al. |
| 2021/0325911 A1 | 10/2021 | Koga et al. |
| 2021/0327164 A1 | 10/2021 | Koga et al. |
| 2021/0327170 A1 | 10/2021 | Rocholl et al. |
| 2021/0327237 A1 | 10/2021 | Rocholl et al. |
| 2021/0339632 A1 | 11/2021 | Rocholl et al. |
| 2021/0339648 A1 | 11/2021 | Koga et al. |
| 2021/0345062 A1 | 11/2021 | Koga et al. |
| 2021/0354329 A1 | 11/2021 | Hou et al. |
| 2021/0362696 A1 | 11/2021 | Verhoff et al. |
| 2021/0362697 A1 | 11/2021 | Verhoff et al. |
| 2021/0370893 A1 | 12/2021 | Verhoff et al. |
| 2021/0370894 A1 | 12/2021 | Verhoff et al. |
| 2021/0373560 A1 | 12/2021 | Koga et al. |
| 2021/0380085 A1 | 12/2021 | Verhoff et al. |
| 2021/0380179 A1 | 12/2021 | Smith et al. |
| 2021/0394394 A1 | 12/2021 | Datema et al. |
| 2021/0394576 A1 | 12/2021 | Venton-Walters et al. |
| 2021/0394578 A1 | 12/2021 | Ellifson et al. |
| 2021/0396293 A1 | 12/2021 | Ellifson et al. |
| 2022/0009323 A1 | 1/2022 | Schmidt et al. |
| 2022/0009328 A1 | 1/2022 | Schmidt et al. |
| 2022/0009330 A1 | 1/2022 | Woo et al. |
| 2022/0009338 A1 | 1/2022 | Yakes et al. |
| 2022/0009761 A1 | 1/2022 | Archer et al. |
| 2022/0017063 A1 | 1/2022 | Shukla et al. |
| 2022/0033181 A1 | 2/2022 | Koga et al. |
| 2022/0065322 A1 | 3/2022 | Dumitru et al. |
| 2022/0072736 A1 | 3/2022 | Steffens et al. |
| 2022/0073016 A1 | 3/2022 | Yamaguchi et al. |
| 2022/0073143 A1 | 3/2022 | Woo et al. |
| 2022/0096884 A1 | 3/2022 | Koga et al. |
| 2022/0097527 A1 | 3/2022 | Koga et al. |
| 2022/0097555 A1 | 3/2022 | Koga et al. |
| 2022/0097556 A1 | 3/2022 | Koga et al. |
| 2022/0097633 A1 | 3/2022 | Koga et al. |
| 2022/0097961 A1 | 3/2022 | Koga et al. |
| 2022/0097962 A1 | 3/2022 | Koga et al. |
| 2022/0097963 A1 | 3/2022 | Koga et al. |
| 2022/0097964 A1 | 3/2022 | Koga et al. |
| 2022/0099723 A1 | 3/2022 | Koga et al. |
| 2022/0105827 A1 | 4/2022 | Rocholl et al. |
| 2022/0106114 A1 | 4/2022 | Buege et al. |
| 2022/0106115 A1 | 4/2022 | Buege et al. |
| 2022/0111717 A1 | 4/2022 | Hendriks et al. |
| 2022/0111910 A1 | 4/2022 | Hirota et al. |
| 2022/0112060 A1 | 4/2022 | Archer et al. |
| 2022/0118854 A1 | 4/2022 | Davis et al. |
| 2022/0134372 A1 | 5/2022 | Andringa |
| 2022/0134834 A1 | 5/2022 | Venton-Walters et al. |
| 2022/0134856 A1 | 5/2022 | Andringa et al. |
| 2022/0134857 A1 | 5/2022 | Baccouche et al. |
| 2022/0135133 A1 | 5/2022 | Cai et al. |
| 2022/0144226 A1 | 5/2022 | Verhoff et al. |
| 2022/0144227 A1 | 5/2022 | Verhoff et al. |
| 2022/0169444 A1 | 6/2022 | Rocholl et al. |
| 2022/0170528 A1 | 6/2022 | Dillman et al. |
| 2022/0176791 A1 | 6/2022 | Danneberg et al. |
| 2022/0176921 A1 | 6/2022 | Verhoff et al. |
| 2022/0185582 A1 | 6/2022 | Koga et al. |
| 2022/0194205 A1 | 6/2022 | Persson et al. |
| 2022/0194333 A1 | 6/2022 | Verhoff et al. |
| 2022/0194334 A1 | 6/2022 | Verhoff et al. |
| 2022/0234554 A1 | 7/2022 | Verhoff et al. |
| 2022/0234555 A1 | 7/2022 | Verhoff et al. |
| 2022/0242487 A1 | 8/2022 | Woo et al. |
| 2022/0258556 A1 | 8/2022 | Rositch et al. |
| 2022/0266907 A1 | 8/2022 | Woo et al. |
| 2022/0267090 A1 | 8/2022 | Rocholl et al. |
| 2022/0289152 A1 | 9/2022 | Verhoff et al. |
| 2022/0289290 A1 | 9/2022 | Andringa et al. |
| 2022/0297521 A1 | 9/2022 | Nusier et al. |
| 2022/0297523 A1 | 9/2022 | Danneberg et al. |
| 2022/0307312 A1 | 9/2022 | Rocholl et al. |
| 2022/0307566 A1 | 9/2022 | Ellifson et al. |
| 2022/0307567 A1 | 9/2022 | Dillman et al. |
| 2022/0332014 A1 | 10/2022 | Datema et al. |
| 2022/0340359 A1 | 10/2022 | Rocholl et al. |
| 2022/0348065 A1 | 11/2022 | Harmon et al. |
| 2022/0348275 A1 | 11/2022 | Harmon et al. |
| 2022/0355140 A1 | 11/2022 | Linsmeier et al. |
| 2022/0355141 A1 | 11/2022 | Linsmeier et al. |
| 2022/0355142 A1 | 11/2022 | Linsmeier et al. |
| 2022/0355690 A1 | 11/2022 | Linsmeier et al. |
| 2022/0371423 A1 | 11/2022 | Balke et al. |
| 2022/0379706 A1 | 12/2022 | Hiramatsu et al. |
| 2022/0379962 A1 | 12/2022 | Kamei et al. |
| 2022/0379963 A1 | 12/2022 | Kamei et al. |
| 2022/0380123 A1 | 12/2022 | Buege et al. |
| 2022/0402475 A1 | 12/2022 | Shukla et al. |
| 2022/0410688 A1 | 12/2022 | Parker et al. |
| 2022/0415103 A1 | 12/2022 | Rocholl et al. |
| 2023/0036105 A1 | 2/2023 | Langworthy et al. |
| 2023/0045568 A1 | 2/2023 | Danneberg et al. |
| 2023/0047430 A1 | 2/2023 | Smith et al. |
| 2023/0048292 A1 | 2/2023 | Smith et al. |
| 2023/0048621 A1 | 2/2023 | Smith et al. |
| 2023/0051168 A1 | 2/2023 | Smith et al. |
| 2023/0052557 A1 | 2/2023 | Smith et al. |
| 2023/0052626 A1 | 2/2023 | Smith et al. |
| 2023/0052923 A1 | 2/2023 | Smith et al. |
| 2023/0062143 A1 | 3/2023 | Zandbergen et al. |
| 2023/0070769 A1 | 3/2023 | Wheeler et al. |
| 2023/0099466 A1 | 3/2023 | Inami et al. |
| 2023/0101665 A1 | 3/2023 | Inami et al. |
| 2023/0103246 A1 | 3/2023 | Inami et al. |
| 2023/0144195 A1 | 5/2023 | Kang et al. |
| 2023/0158876 A1 | 5/2023 | Hennessey et al. |
| 2023/0242195 A1 | 8/2023 | Beals |
| 2023/0249534 A1 | 8/2023 | Kim et al. |
| 2023/0264563 A1 | 8/2023 | Kamemoto et al. |
| 2023/0264752 A1 | 8/2023 | Kamemoto et al. |
| 2023/0311631 A1 | 10/2023 | Boeck et al. |
| 2023/0311632 A1 | 10/2023 | Kellner et al. |
| 2023/0339275 A1 | 10/2023 | Hiramatsu et al. |
| 2024/0001992 A1 | 1/2024 | Lee et al. |
| 2024/0010077 A1 | 1/2024 | Perlo et al. |
| 2024/0014495 A1 | 1/2024 | Lanzerath et al. |
| 2024/0034137 A1 | 2/2024 | Weber et al. |
| 2024/0034411 A1 | 2/2024 | Maltisotto |
| 2024/0116350 A1 | 4/2024 | Matsueda |
| 2024/0123807 A1 | 4/2024 | Hausler et al. |
| 2024/0123811 A1 | 4/2024 | Yi et al. |
| 2024/0149654 A1 | 5/2024 | Daniel et al. |

(56) References Cited

U.S. PATENT DOCUMENTS

| | | |
|---|---|---|
| 2024/0166040 A1 | 5/2024 | Coupal-Sikes et al. |
| 2024/0208315 A1 | 6/2024 | Grinstead |
| 2024/0246403 A1 | 7/2024 | Landvik et al. |

OTHER PUBLICATIONS https://info.macktrucks.com/refuse-revolution; "Welcome to the refuse revolution. Mack LR Electric." Retrieved on Mar. 21, 2023.
https://www.youtube.com/watch?v=NQFtAnm7D-c; "All-New Mack LR Electric Garbage Truck." Retrieved on Mar. 21, 2023.
Canada Office Action dtd Nov. 27, 2023 re CA Appl 3173738.
Office Action issued in connection with Canadian Appl. No. 3173738 dated Oct. 17, 2024.
Office Action issued in Canadian Appl. No. 3173738 dated Nov. 6, 2025.

\* cited by examiner

1200

Receive module — 1202

Transfer energy from module to vehicle subcomponent — 1204

Receive supplemental energy — 1206

CHASSIS WITH STRUCTURAL BATTERY COMPARTMENT

CROSS-REFERENCE TO RELATED PATENT APPLICATIONS

This patent application claims the benefit of and priority to U.S. Provisional Patent Application No. 63/242,304, filed on Sep. 9, 2021, and U.S. Provisional Patent Application No. 63/242,317, filed on Sep. 9, 2021, which are incorporated by reference herein in their entirety.

BACKGROUND

The present disclosure relates generally to vehicles. More specifically, the present disclosure relates to a vehicle including a chassis. The chassis may be coupled to components, such as a body or an implement, that are specific to a desired application of the vehicle.

SUMMARY

One exemplary embodiment of the invention relates to an electrified vehicle. The electrified vehicle includes a chassis, a body, and a cab. The chassis is configured to support a tractive element. The chassis includes a battery box. The body is supported by the chassis. The cab is supported by the chassis. The battery box includes a shell defining an internal cavity. The battery box is configured to receive a module. The module includes a battery and a module terminal. The battery box is configured to transfer energy from the module to at least one component of the electrified vehicle. The internal cavity of the battery box comprises a system terminal configured to contact the module terminal of the module to facilitate the transfer of the energy from the module to the component of the electrified vehicle.

Another exemplary embodiment of the invention relates to an electrified vehicle. The electrified vehicle includes a chassis, a body, a cab, and a battery box. The chassis is configured to support a tractive element. The body is supported by the chassis. The cab is supported by the chassis. The battery box is coupled to the chassis and is configured to receive a module. The battery box comprises a first portion and a second portion. The first portion comprises a first depth and a first width and the second portion comprising a second depth and a second width. The first depth is different from the second depth and the first width different from the second width.

Another exemplary embodiment of the invention relates to a method of providing energy to a component of a vehicle. The method includes receiving, by a chassis of the vehicle, a module comprising at least one electrical energy storage device configured to store the energy and a module terminal. The chassis is configured to support a tractive element. The chassis comprising a battery box. The battery box comprising a system terminal. The method includes transferring, by the chassis of the vehicle, energy from the electrical energy storage device of the module to the component of the vehicle. The energy transfers from the module via the module terminal and to the component via the system terminal of the battery box.

Another exemplary embodiment relates to an electrified vehicle. The electrified vehicle includes a front subframe, a rear subframe, and a body. The body connects the front subframe to the rear subframe so that forces acting on the front subframe and the rear subframe are transmitted through the body. A housing is coupled to the underside of the body between the front subframe and the rear subframe. An energy storage system is enclosed within the housing and includes a battery and a battery interface configured to electrically couple the battery to at least one component of the electrified vehicle.

Another exemplary embodiment relates to an electrified vehicle. The electrified vehicle includes a chassis. The chassis includes a front subframe, a rear subframe, and a body that directly couples the front subframe to the rear subframe. A tractive element is supported by the chassis. A drive motor is supported by the chassis and coupled to the tractive element to rotate the tractive element. A housing is coupled to the body between the front subframe and the rear subframe. The housing includes a battery, and the battery is electrically coupled to the drive motor.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
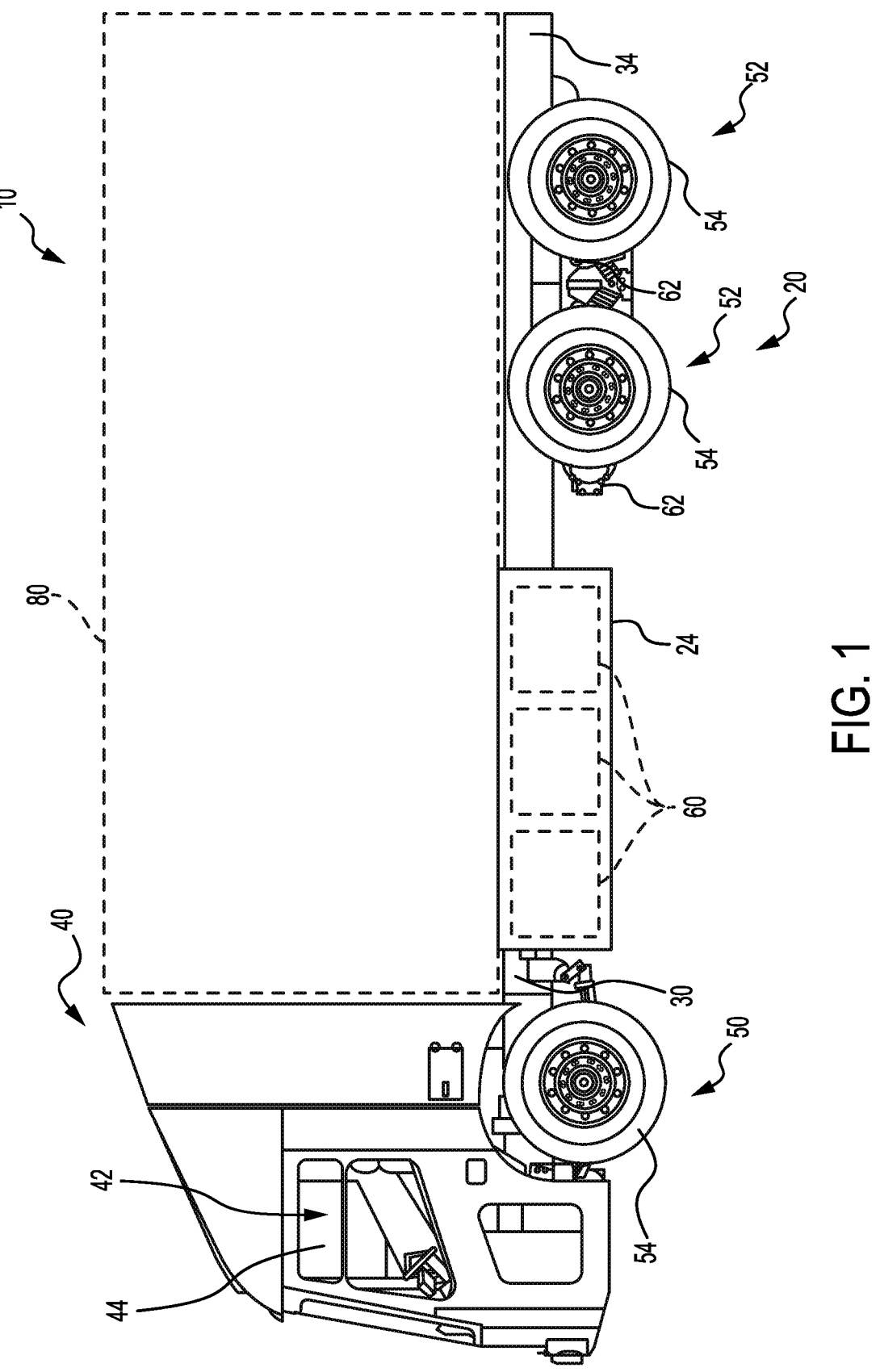
FIG. 1 is a left side view of a vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, vocational vehicles (e.g., refuse trucks, mixing vehicles) include a battery box that defines a structural component of a chassis of the vehicle. The battery box provides support and structure for the vehicle while also providing storage, protection, functionality, and accessibility for batteries and other systems. In one embodiment, the battery box is disposed on the bottom of a vocational vehicle between a front and a rear axle. The battery box may have integrated suspension hard points. In other embodiments, a front or a rear subframe is attached to the battery box. The battery box may extend the full width of the vehicle to increase the volume for batteries and other systems therein. In other embodiments, the battery box extends over the rear axle(s). Such an embodiment leads to improved weight distribution and has increased battery volume. In one embodiment, the battery box includes battery mounting provisions, a system routing pathway, a bus bar, a thermal management system, a power distribution unit, and a charge port, among other components and systems.

Incorporating the battery box as a structural element of a vocational vehicle simplifies installation and maintenance of batteries and other vehicle systems and improves the functionality of the vehicles. According to an exemplary embodiment, the battery box as described herein provides an alternative power source to the traditional fuel source, saves space inside the vehicle by moving the batteries and other systems to the exterior, reduces weight by eliminating redundant structures, and simplifies assembly, repair, and replacement by allowing the systems to be assembled off the truck then installed as a complete module, among others.

According to another exemplary embodiment an electrified vocational vehicle (e.g., refuse truck, mixer vehicle, fire fighting vehicle, etc.) includes a body that is a main structural component thereof, thereby forming a structural body. The electrified vocational vehicle may not have a conventional frame (e.g., a pair of frame rails). In one embodiment, the body has an interchangeable energy storage system positioned where the frame would traditionally be positioned. The structural body eliminates conventional components and reduces weight. Further, on-vehicle space previously occupied by the frame is now available to house other vehicle components such as the interchangeable energy storage system. In one embodiment, the structural body connects front and rear subframes of the vehicle as the main structural member of the chassis, the energy storage system for powering the vehicle and/or its various components, a cab either directly or through the front subframe, etc., to provide support as the main structural member for the entire vehicle. In one embodiment, the energy storage system includes a battery housing that receives and protects an interchangeable battery module. The battery module includes the batteries, associated cabling, thermal management systems, communication systems, monitoring systems, etc., and provides a complete, swappable, battery module that can be assembled independent of the vehicle and installed as a complete unit. The vehicle with the structural body acting as the includes an energy storage system mounted to the underside of the body where a conventional frame would otherwise be located, according to an exemplary embodiment.

Figure 2:
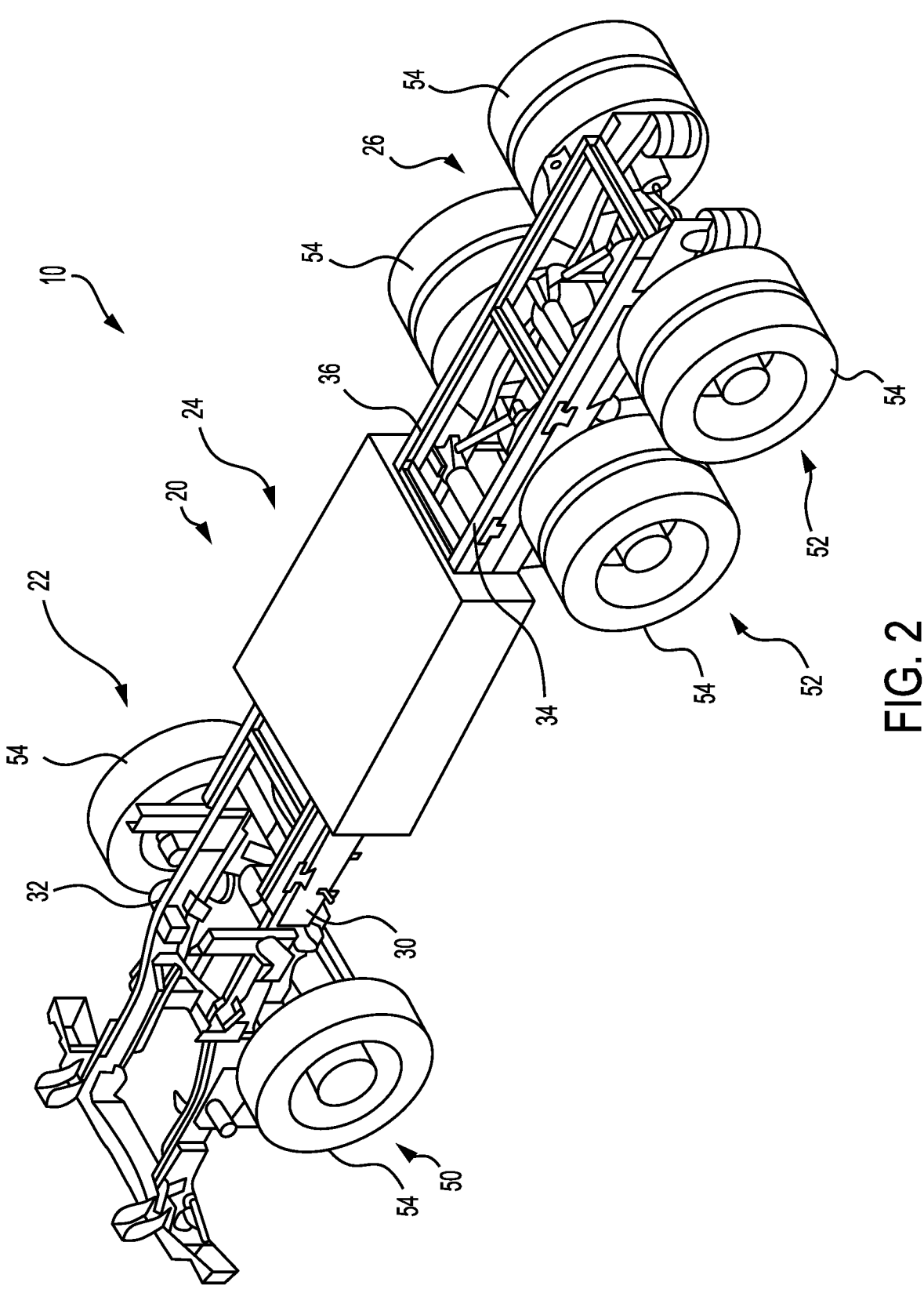
FIG. 2 is a perspective view of a chassis of the vehicle of FIG. 1.

According to an exemplary embodiment, as shown in FIGS. 1 and 2, a vehicle (e.g., a vehicle assembly, a truck, a vehicle base, etc.), shown as vehicle 10, includes a frame assembly or chassis assembly, shown as chassis 20. The chassis assembly may support other components of the vehicle 10. In some embodiments, the chassis 20 extends longitudinally along a length of the vehicle 10. The chassis 10 may extend substantially parallel to a primary direction of travel of the vehicle 10. According to an exemplary embodiment, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing provides frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. In some embodiments, the middle section 24 contains or includes one or more electrical energy storage devices (e.g., batteries, capacitors, etc.). In another embodiment, the middle section 24 includes fuel tanks. In yet another embodiment, the middle section 24 defines a void space or storage volume that can be filled by a user.

According to an exemplary embodiment, a cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. In one embodiment, the cab interior 42 contains components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

According to an exemplary embodiment, the vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. In one embodiment, the vehicle 10 includes a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. As shown in FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system includes a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 is further be configured to support non-hybrid powertrains. For example, the powertrain system may include a primary driver that is a compression-ignition internal combustion engine that utilizes diesel fuel.

As shown in FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-8 illustrate various examples of how the vehicle 10 may be configured for specific applications. Although only a certain set of vehicle configurations is shown, it should be understood that the vehicle 10 may be configured for use in other applications that are not shown.

According to an exemplary embodiment, the application kit 80 includes various actuators to facilitate certain functions of the vehicle 10. In one embodiment, the application kit 80 includes hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. In another embodiment, the application kit 80 includes hydraulic or pneumatic components that form a hydraulic or pneumatic circuit (e.g., conduits, valves, pumps, compressors, gauges, reservoirs, accumulators, etc.). By way of another embodiment, the application kit 80 includes electrical components (e.g., batteries, capacitors, voltage regulators, motor controllers, etc.). The actuators may be powered by components of the vehicle 10. In some embodiments, the actuators are powered by the batteries 60, the drive motors 62, or the primary driver (e.g., through a power take off).

Figure 3:
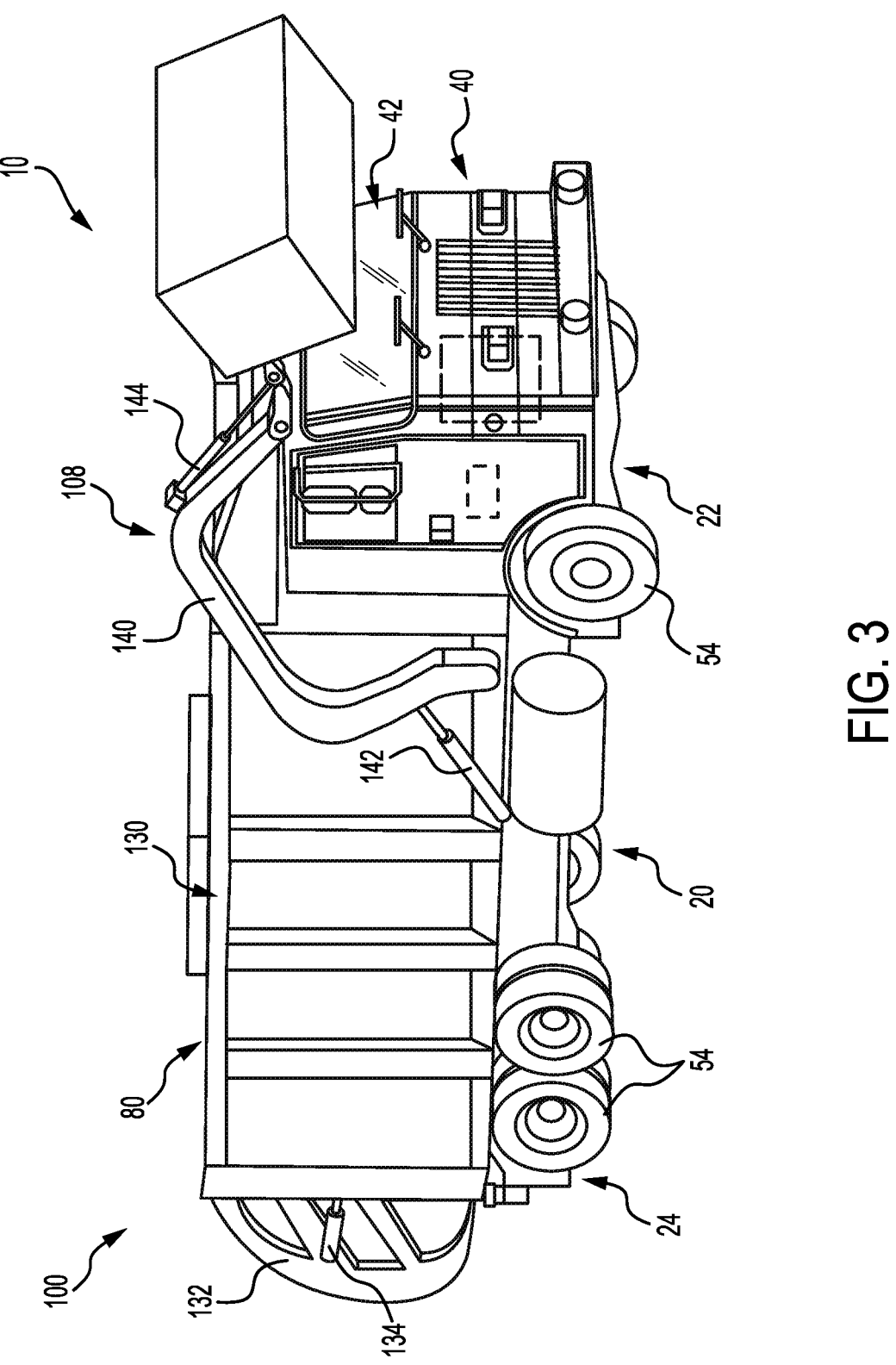
FIG. 3 is a perspective view of the vehicle of FIG. 1 configured as a refuse vehicle, according to an exemplary embodiment.

As shown in FIG. 3, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 3, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). According to an exemplary embodiment, loose refuse is placed into the refuse compartment 130 to be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 3, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20. In another embodiment, the lift arms 140 are rotatably coupled to the refuse compartment 30 on each side of the refuse vehicle 100 (e.g., through a pivot, a lug, a shaft, etc.). Such an embodiment provides that the lift assembly 108 extends forward relative to the cab 40 (e.g., a front-loading refuse truck, etc.). In other embodiments, the lift assembly 108 extends rearward relative to the application kit 80 (e.g., a rear-loading refuse truck). In yet other embodiments, the lift assembly 108 extends from a side of the application kit 80 (e.g., a side-loading refuse truck). As shown in FIG. 3, the lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container) in order to assist in tipping refuse out of the refuse container and into the refuse compartment 130. The lift arm actuators 142 may then rotate the lift arms 140 to return the empty refuse container to the ground.

Figure 4:
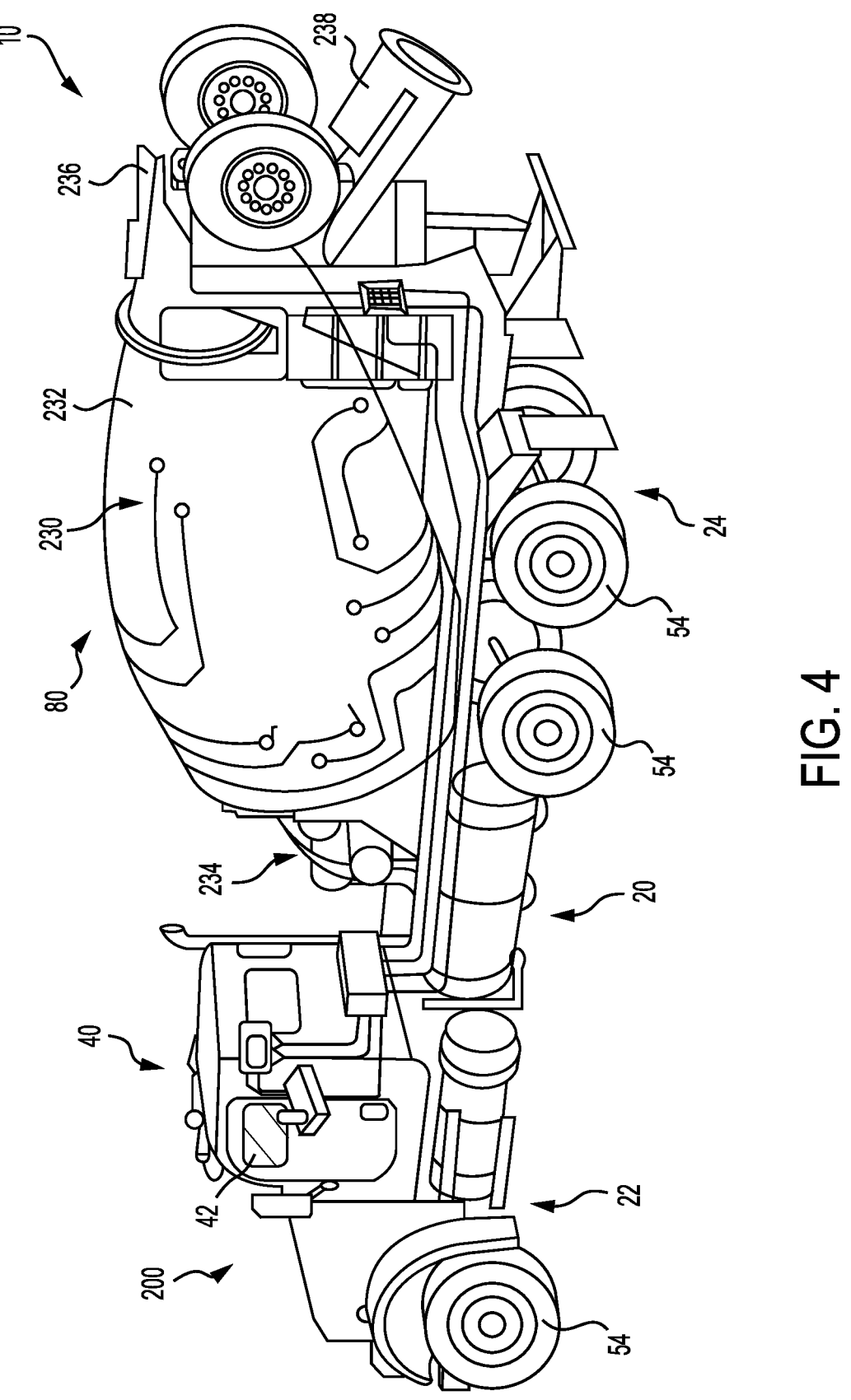
FIG. 4 is a perspective view of the vehicle of FIG. 1 configured as a mixer vehicle, according to an exemplary embodiment.

According to another exemplary embodiment, as shown in FIG. 4, the vehicle 10 is configured as a mixer truck (e.g., a concrete mixer truck, a mixer vehicle, etc.), shown as mixer truck 200. Specifically, the mixer truck 200 is a rear-discharge concrete mixer truck. In other embodiments, the mixer truck 200 is a front-discharge concrete mixer truck.

As shown in FIG. 4, the application kit 80 includes a mixing drum assembly (e.g., a concrete mixing drum), shown as drum assembly 230. The drum assembly 230 includes a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plan extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/ command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves). The injection system may include an injection valve that selectively fluidly couples a supply of fluid to the inner volume of the mixing drum 232. In one embodiment, the injection system is used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 includes an actuator positioned such that the chute 238 may be selectively pivotable to position the chute 238 (e.g., vertically, laterally, etc.), for example, at an angle at which the mixture is expelled from the mixing drum 232.

Figure 5:
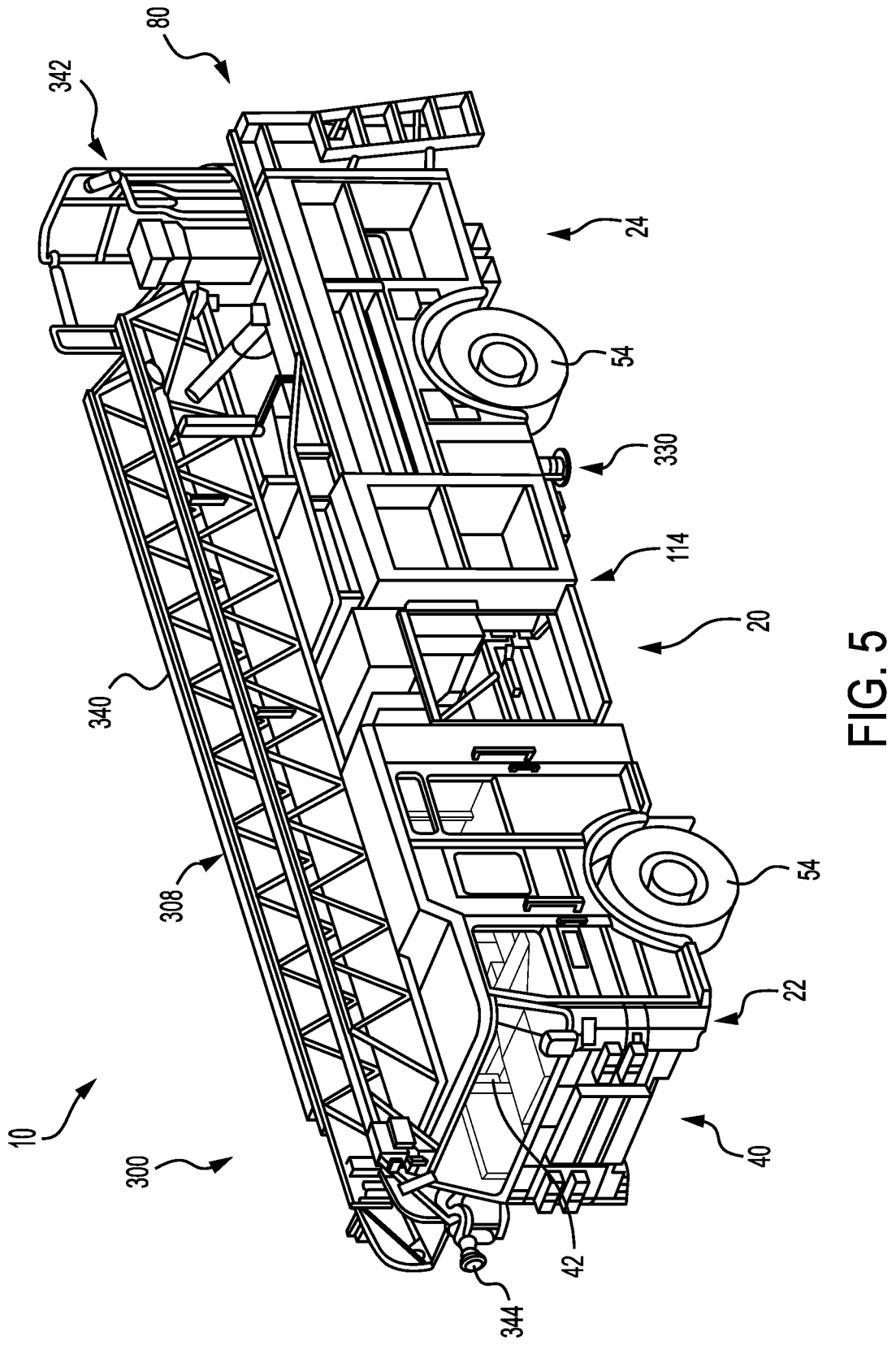
FIG. 5 is a perspective view of the vehicle of FIG. 1 configured as a fire fighting vehicle, according to an exemplary embodiment.

As shown in FIG. 5, the vehicle 10 is configured as a fire fighting vehicle or fire apparatus (e.g., a turntable ladder truck, a pumper truck, a quint, etc.), shown as fire fighting vehicle 300. As shown in FIG. 5, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. According to an exemplary embodiment, the vehicle 10 is be configured as a police vehicle, an ambulance, a tow truck, or still other vehicles used for responding to a scene (e.g., an accident, a fire, an incident, etc.).

As shown in FIG. 5, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that are selectively opened and/or accessed for storage and/or component inspection, maintenance, and/or replacement.

As shown in FIG. 5, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope)

relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 6:
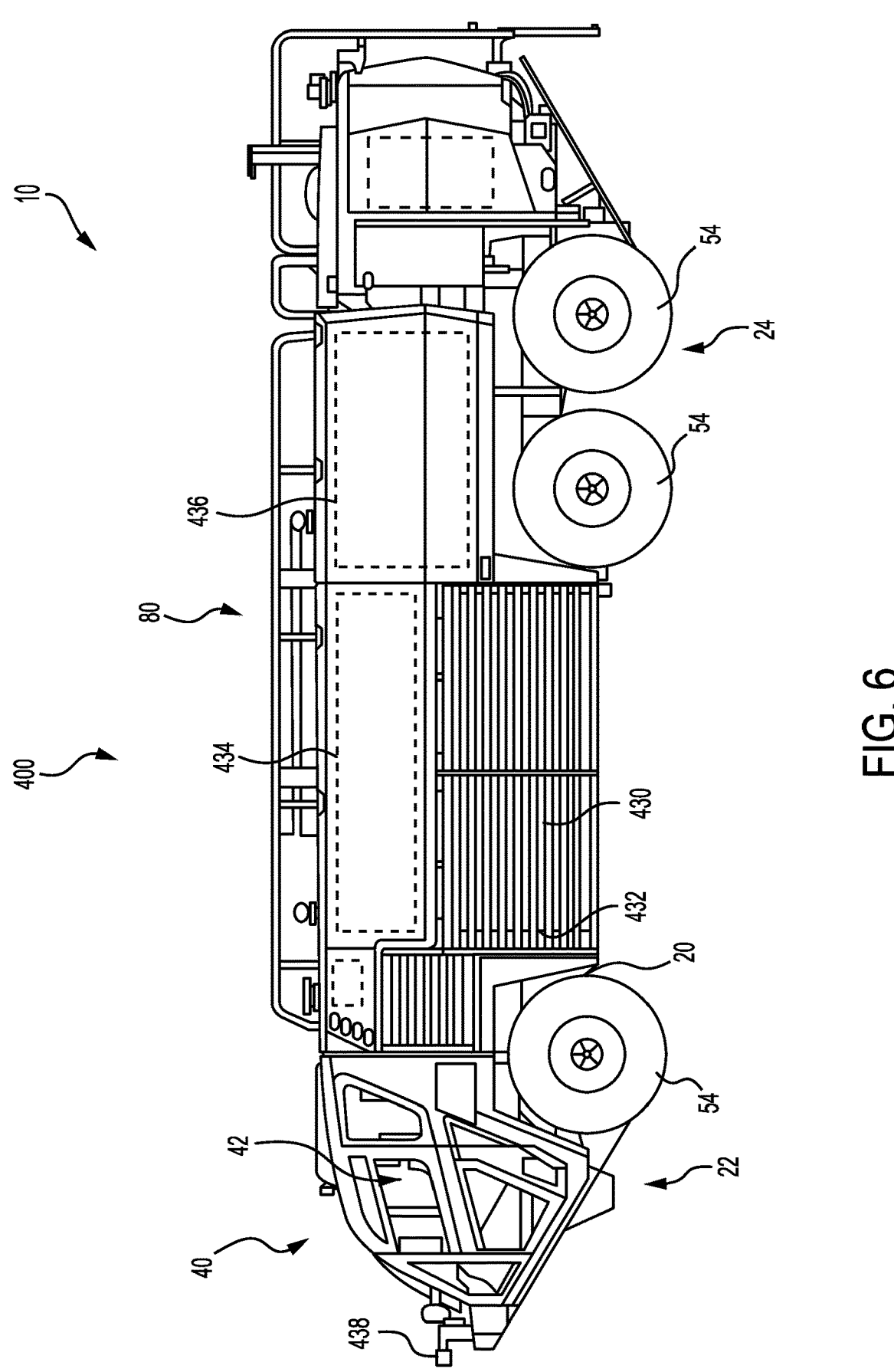
FIG. 6 is a left side view of the vehicle of FIG. 1 configured as an airport fire fighting vehicle, according to an exemplary embodiment.

According to another exemplary embodiment, as shown in FIG. 6, the vehicle 10 is configured as a fire fighting vehicle, shown as airport rescue and fire fighting (ARFF) truck 400. As shown in FIG. 6, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80, as shown in FIG. 6, includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may to pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 6, the monitor 438 is coupled to a front end of the cab 40.

Figure 7:
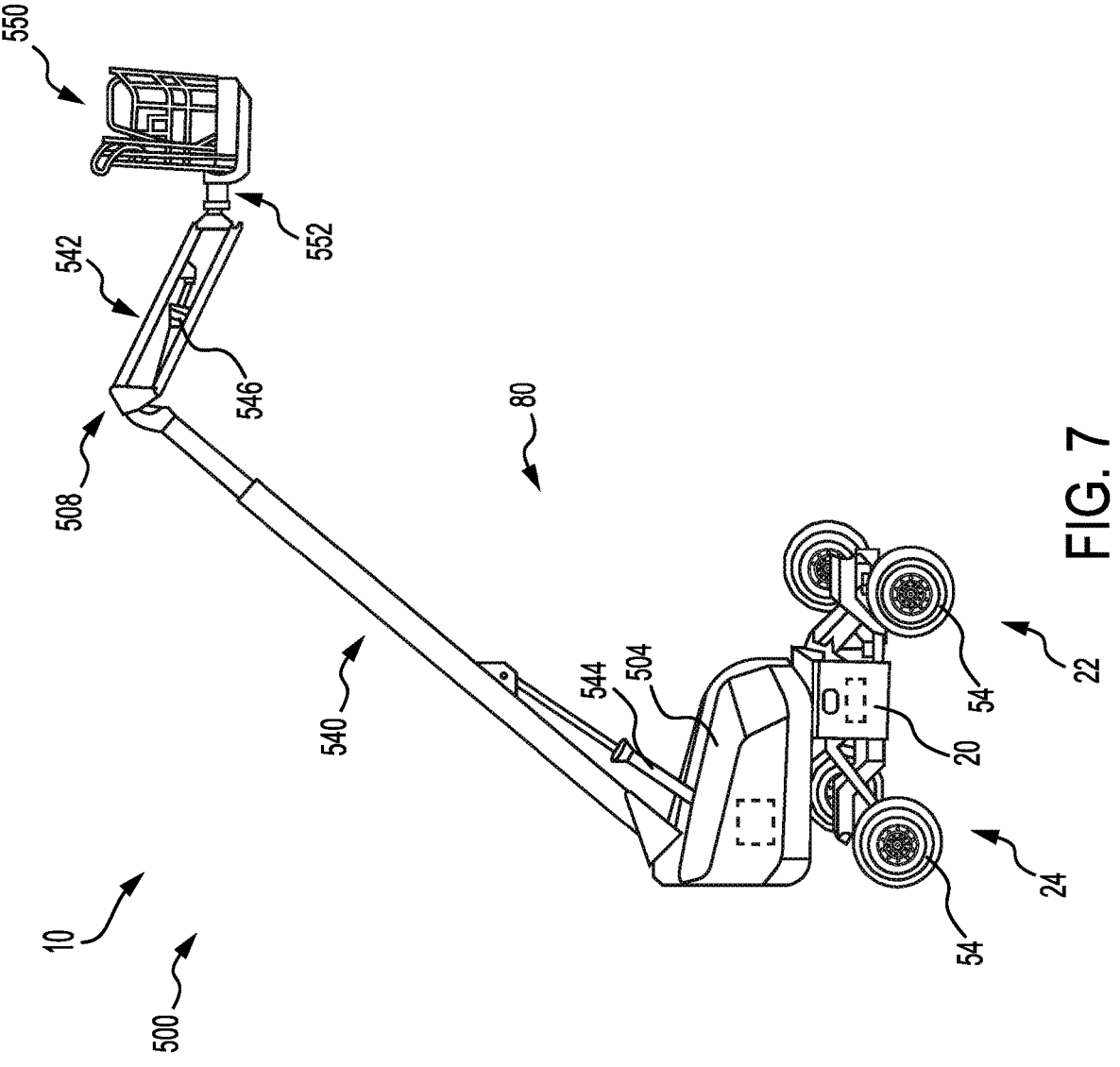
FIG. 7 is a perspective view of the vehicle of FIG. 1 configured as a boom lift, according to an exemplary embodiment.

As shown in FIG. 7, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 7, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 7, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

As shown in FIG. 7, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

According to an exemplary embodiment, the platform assembly 550 provides a platform configured to support one or more operators or users. In some embodiments, the platform assembly 550 includes accessories or tools configured for use by the operators. In one embodiment, the platform assembly 550 includes pneumatic tools (e.g., an impact wrench, airbrush, nail gun, ratchet, etc.), plasma cutters, welders, spotlights, etc. In other embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 8:
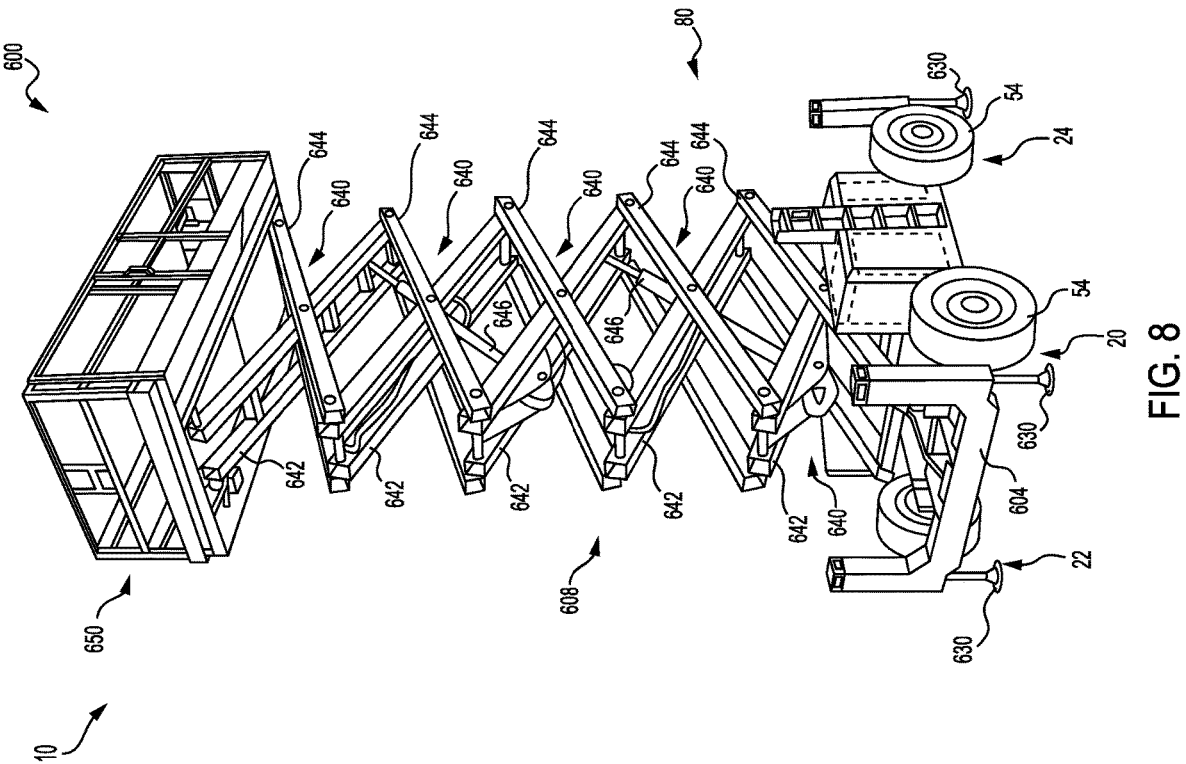
FIG. 8 is a perspective view of the vehicle of FIG. 1 configured as a scissor lift, according to an exemplary embodiment.

According to an exemplary embodiment, as shown in FIG. 8, the vehicle 10 is configured as a lift device, shown as scissor lift 600. As shown in FIG. 8, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 8, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the base assembly 604. The length of each of the leveling actuators 630 in their respective deployed positions may be varied in order to adjust the pitch (e.g., rotational position about a lateral axis) and the roll (e.g., rotational position about a longitudinal axis) of the base assembly 604 and/or the chassis 20. Accordingly, the lengths of the leveling actuators 630 in their respective deployed positions may be adjusted to level the base assembly 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

According to an exemplary embodiment, the lift assembly 608 includes a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the base assembly 604. The top beds of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

As shown in FIG. 8, the lift assembly 608 also includes one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

According to an exemplary embodiment, as distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Battery Box

Figures 9A, 9B:
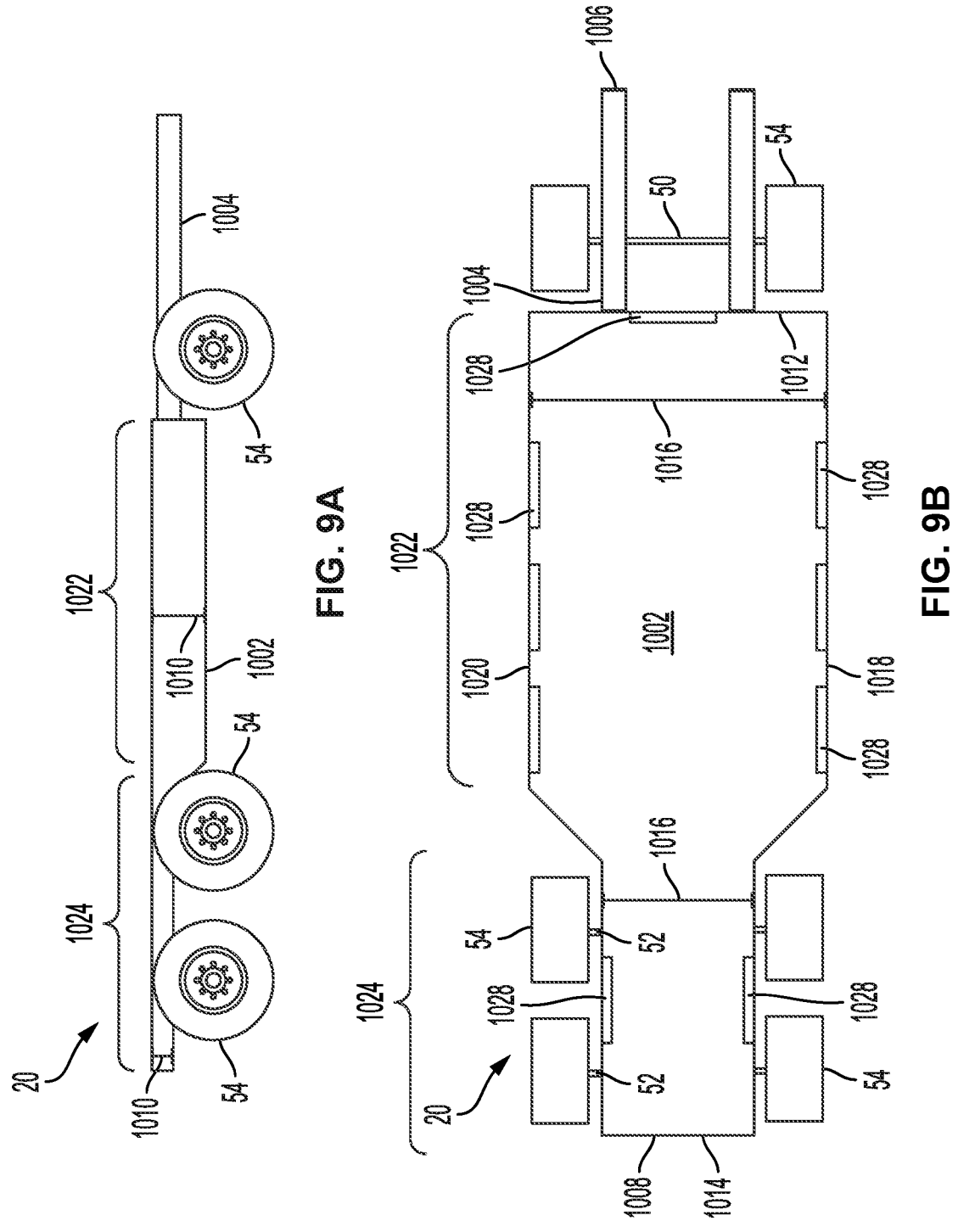
FIG. 9A is a side view of a chassis of the vehicle of FIG. 1, according to an exemplary embodiment.
FIG. 9B is a top view of a chassis of the vehicle of FIG. 1, according to an exemplary embodiment.

According to an exemplary embodiment, as shown in FIGS. 9A and 9B, a vehicle 10, includes a chassis 20. The vehicle 10 may be any vocational vehicle. The chassis 20 may extend along the length of the vehicle 10. The chassis 20 may include at least one of a structural housing, shown as battery box or enclosure 1002, and a subframe 1004, and any combination thereof. In one exemplary embodiment, the chassis 20 is one contiguous battery box 1002. The battery box 1002 may be made of any material strong enough to support the various components and subcomponents of the vehicle 10 and to protect the batteries 60 and other systems contained therein. The battery box 1002 may include integrated suspension hard points such that it acts as a typical frame or chassis of a vehicle by providing the necessary control and stability to the vehicle 10. According to an exemplary embodiment, the battery box 1002 may include sufficient springs, shock absorbers, and linkages that connect the wheels 54 to the vehicle 10 and allow relative motion between the vehicle 10 and the wheels 54. The one contiguous battery box 1002 may extend from a front end 1006 of the vehicle 10 (e.g., an end proximate the cab 40) to a rear end 1008 of the vehicle 10 (e.g., an end proximate the body 80). An internal cavity of the battery box 1002 may be one large open space. In another embodiment, the battery box 1002 is divided into compartments. In another exemplary embodiment, the chassis 20 includes the battery box 1002 and at least one subframe 1004. The subframe 1004 may provide support to the portions of the vehicle 10 that are not supported by the battery box 1002. The battery box 1002 may be coupled with the subframe 1004. In some embodiments, the chassis 20 includes at least one of a front subframe 1004 and a rear subframe 1004. If the volume of the battery box 1002 disposed between front axle 50 and rear axles 52 of the vehicle 10 provides enough space for batteries 60 and other systems, then the remainder of the chassis 20 extending over the axles toward the front end 1006 and the rear end 1008 of the vehicle 10 can include a subframe 1004.

According to an exemplary embodiment, the battery box 1002 has at least one depth 1010. In some embodiments, the depth 1010 is measured along a direction that is perpendicular to a ground on which the vehicle 10 travels. The depth 1010 may be based, in part, on the size of contents (e.g., systems, batteries, modules) disposed in the battery box 1002. In one embodiment, if the entire battery box 1002 is disposed between the front axle 50 and the rear axles 52 of the vehicle 10 (e.g., the chassis 20 includes a rear subframe 1004 and a front subframe 1004), the battery box 1002 has one uniform depth 1010. In another embodiment, if the battery box 1002 extends toward the rear end 1008 of the vehicle 10 over the rear axles 52, a first portion 1022 disposed between the front and rear axles 50, 52 has a first depth 1010 and a second portion 1024 disposed above the rear axles 52 has a second depth 1010. According to an exemplary embodiment, the first depth 1010 is greater than the second depth 1010. Any portion of the battery box 1002 may include more than one depth 1010. In another embodiment, the battery box 1002 has a lattice structure. The lattice structure reduces weight by removing material from the battery box 1002 that is unnecessary, provides means for positioning and securing contents disposed within the battery box 1002, and provides beneficial structural properties (e.g., strength, flexibility).

According to an exemplary embodiment, as shown in FIG. 9B, the front subframe 1004 may be coupled with a front side 1012 of the battery box 1002. In some embodiments, the front side 1012 of the battery box 1002 may be disposed at a position directly adjacent the wheels 54 coupled with a front axle 50. In other words, the front side 1012 of the battery box 1002 may define the same longitudinal position as the front axle 50 (e.g., the front side 1012 may align with an central axis defined along the front axle 50). In some embodiments, the front side 1012 of the battery box 1002 may be arranged anywhere between the wheels 54 coupled with the front axle 50 and the wheels 54 coupled with a rear axle 52. In some embodiments, the front side 1012 of the battery box 1002 is disposed halfway between the front axle 50 and the front-most rear axle 52. The front subframe 1004 may extend from the front end 1006 of the vehicle 10 (or beyond the front end 1006) to the position where the front side 1012 of the battery box 1002 is disposed. The chassis 20 may also be configured such that a subframe 1004 can be coupled with, either directly or indirectly, a top, bottom, or side of the battery box 1002. In another embodiment, the battery box 1002 can have an external connection point (e.g., a bracket) disposed on the bottom of the battery box 1002. The external connection point can be configured to couple with the subframe 1004.

Figure 11A:
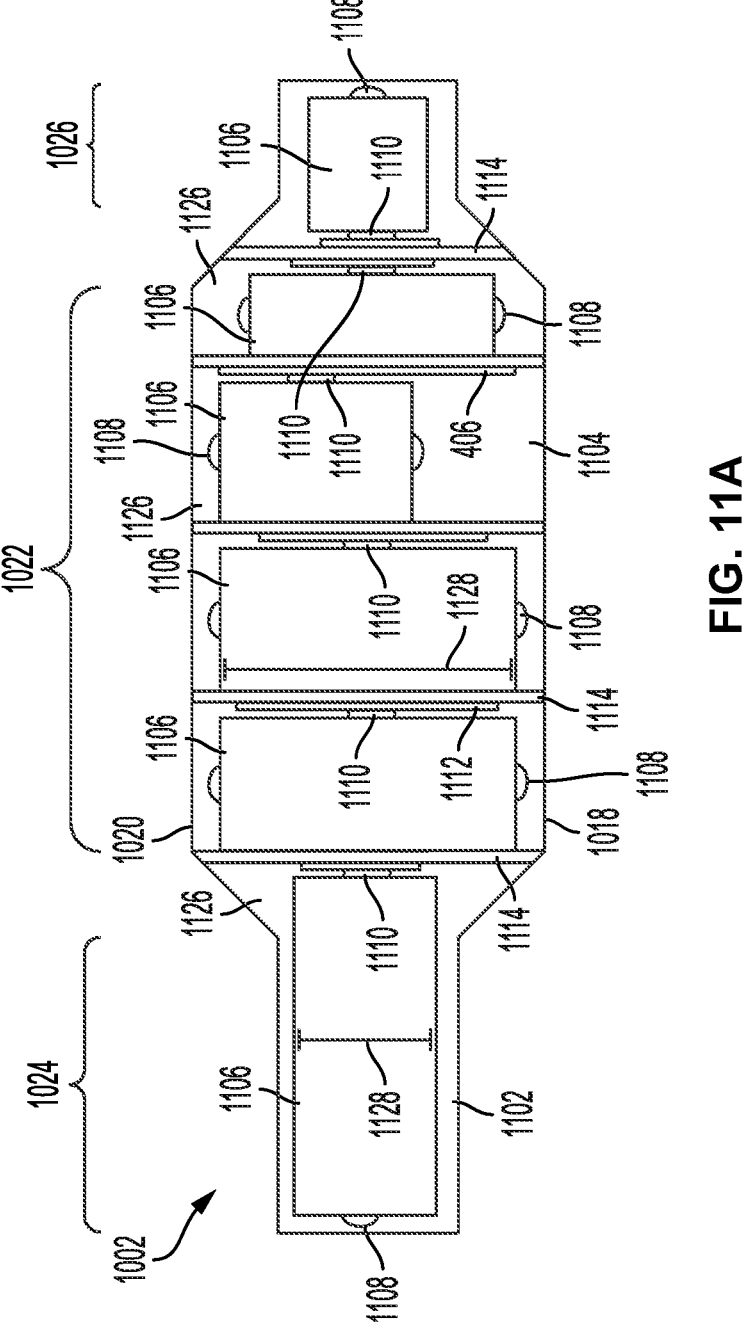
FIG. 11A is a top view of an internal cavity of a battery box of the vehicle of FIG. 1, according to an exemplary embodiment.

In some embodiments, the battery box 1002 extends away from the front side 1012 of the battery box 1002 toward the rear end 1008 of the vehicle 10. In other embodiments, a back side 1014 of the battery box 1002 is disposed in front of the wheels 54 coupled with the front-most rear axle 52. In other embodiments, the entire battery box 1002 is disposed between the front axle 50 and the front-most rear axle 52. In such an embodiment, the battery box 1002 has a width 1016 that extends a full width of the vehicle 10 (e.g., the width 1016 of the battery box 1002 is approximately equal to a lateral distance between the laterally-outwardmost points defined by the wheels 54). As such, a right side 1018 of the battery box 1002 aligns with a right side of the vehicle 10 and a left side 1020 of the battery box 1002 aligns with a left side 1020 of the vehicle 10 (e.g., when looking from the rear end 1008 toward the front end 1006). The width 1016 may also be larger than the width of the vehicle 10 or smaller than the width of the vehicle 10. The battery box 1002 may also have more than one width 1016. In another embodiment, the back side 1014 of the battery box 1002 is disposed at or around the rear end 1008 of the vehicle 10. In such an embodiment, a first portion 1022 of the battery box 1002 adjacent to the front side 1012 has a first width 1016 and a second portion 1024 of the battery box 1002 adjacent to the rear end 1008 has a second width 1016, with the second width 1016 being less than the first width 1016. As such, the first portion 1022 may be disposed between the front axle 50 and the rear axles 52. The first portion 1022 may have a width 1016 proximate the width of the vehicle 10. The second portion 1024 may be disposed above the rear axles 52 and between the wheels 54 disposed on the left side of the vehicle 10 and the wheels 54 disposed on the right side of the vehicle 10. To fit between the wheels 54, the width 1016 of the second portion 1024 may be smaller than the width 1016 of the first portion 1022. In some embodiments, as shown in FIG. 11A, among others, the battery box 1002 may have a third portion 1026 that extends toward the front end 1006 from the first portion 1022. The third portion 1026 may be disposed above the front axle 50 and between the front wheels 54 of the vehicle 10. The third portion 1026 has a third width 1016. The third width 1016 may be the same as or different from the first or second width 1016.

According to an exemplary embodiment, the back side 1014 of the battery box 1002 is disposed anywhere between the front side 1012 of the battery box 1002 and the rear end 1008 of the vehicle 10 (or beyond the rear end 1008). As shown in FIG. 9B, the back side 1014 of the battery box 1002 extends beyond (e.g., longitudinally over and past) the rear-most rear axle 52 and is disposed at a position proximate the rear end 1008 of the vehicle 10. In another embodiment, the back side 1014 of the battery box 1002 is disposed at a position in front of the front-most rear axle 52. In such an embodiment, the chassis 20 includes a rear subframe 1004 extending at least from the back side 1014 of the battery box 1002 to the rear end 1008 of the vehicle 10. The rear subframe 1004 may be coupled with the battery box 1002 in a similar manner as the front subframe 1004 as described herein.

The battery box 1002 may comprise any shape or orientation. As shown in FIG. 9B, the first portion 1022 and the second portion 1024 of the battery box 1002 have a rectangular shape with square corners. A center line of the first portion 1022 may align with a center line of the second portion 1024. The first portion 1022 may transition to the second portion 1024 at a forty-five degree angle. In other embodiments, the first portion 1022 is oval and the second portion 1024 is square with rounded corners. The first portion 1022 may offset from the second portion 1024 (e.g., the centerlines do not align). The first portion 1024 may transition to the second portion 1022 with differing angles.

Figure 10:
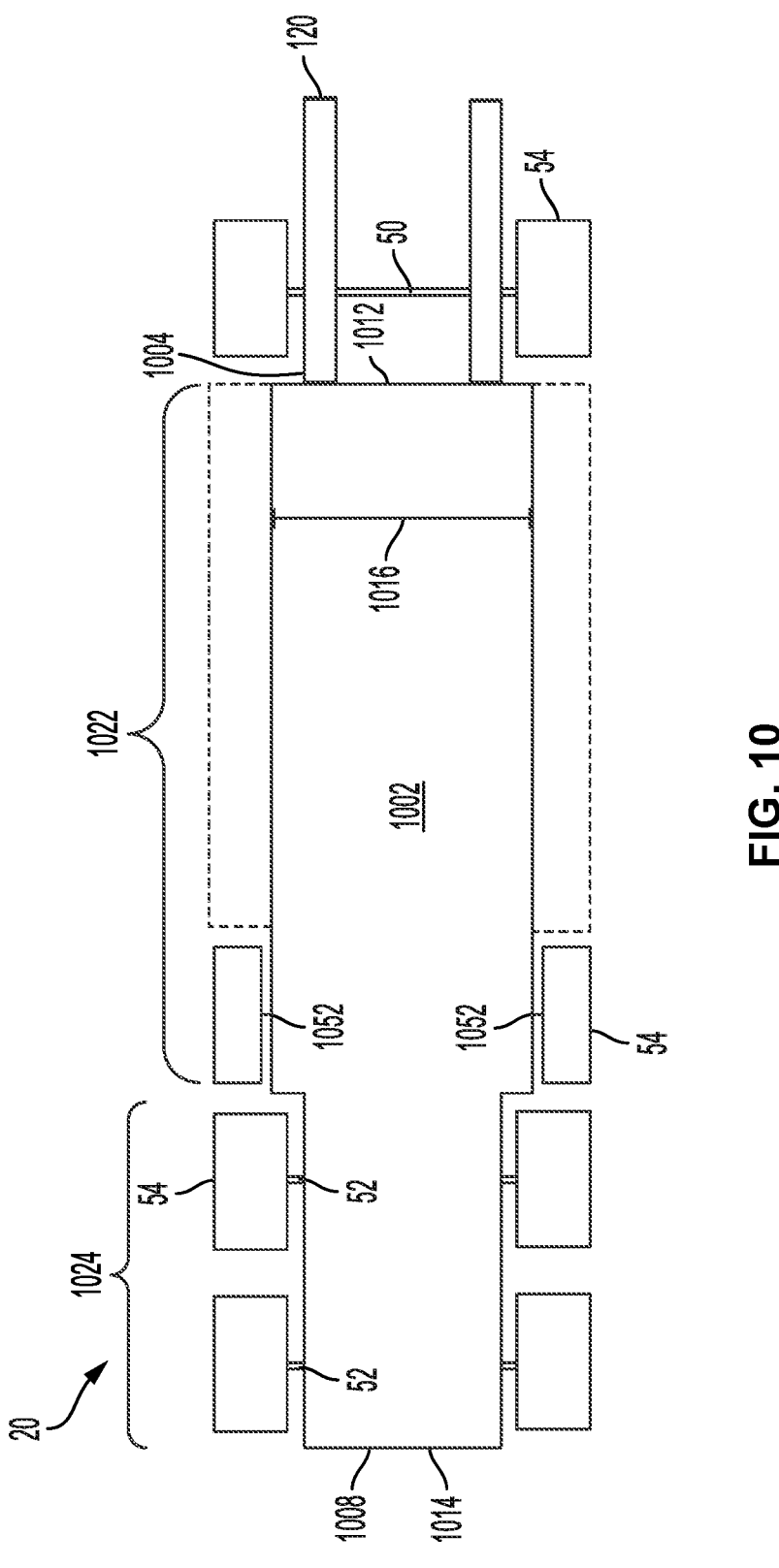
FIG. 10 is a top view of a chassis of the vehicle of FIG. 1, according to another exemplary embodiment.

According to an exemplary embodiment, as shown in FIG. 10, the battery box 1002 is configured to accommodate a tag (or auxiliary) axle 1052. The battery box 1002 may be reinforced (e.g., add structural bracing, use stronger material) at a location where the auxiliary axle 1052 can be coupled with the battery box 1002 (e.g., bolted to a side of the battery box 1002). According to an exemplary embodiment, the width 1016 of the battery box 1002 is such that the wheel 54 coupled with the auxiliary axle 1052 does not extend beyond the width of the vehicle 10. The battery box 1002 may be configured to allow the auxiliary axle 1052 to be added or removed from the vehicle 10 at any time.

Figure 11B:
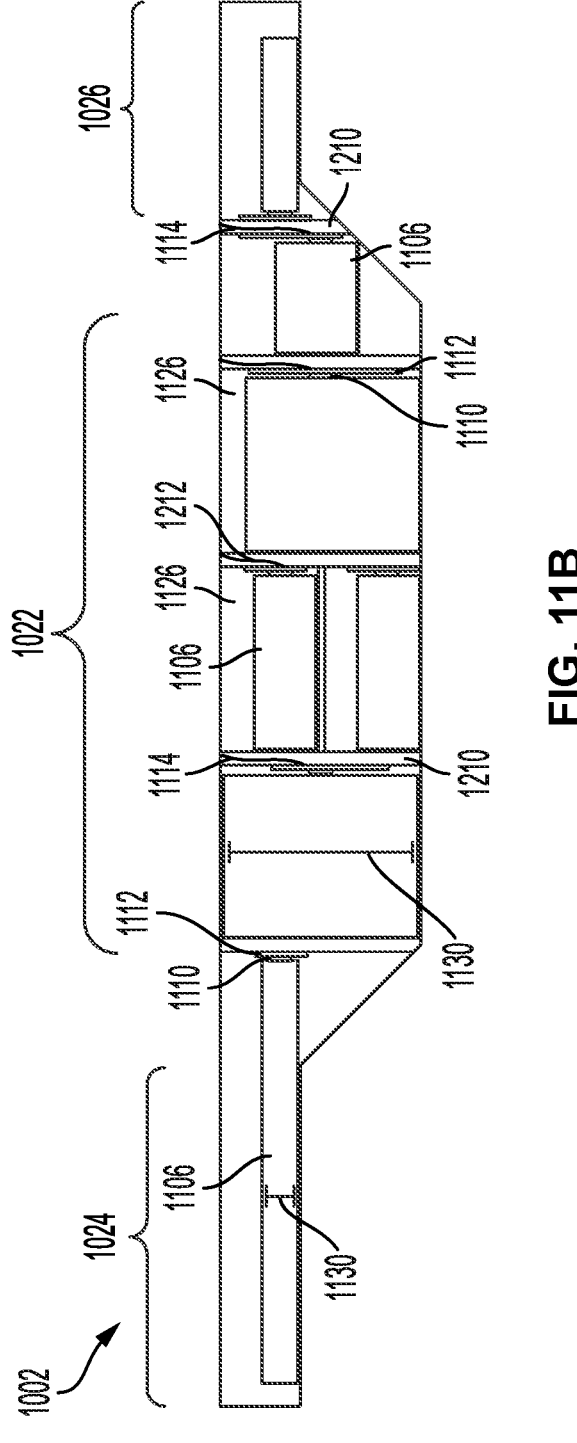
FIG. 11B is a side view of the internal cavity of the battery box of FIG. 11A, according to an exemplary embodiment.

According to an exemplary embodiment, as shown in FIGS. 11A and 11B, the battery box 1002 includes a shell 1102 that defines an internal cavity 1104. The internal cavity 1104 may be configured to receive at least one module 1106. The module 1106 may be or include at least one battery 60. The module 1106 may include at least one gripping component 1108 configured to assist in installation and removal of the module 1106 from the internal cavity 1104 of the battery box 1002. In some embodiments, the gripping component 1108 is a handle. The handle may be any shape, size, or material. The handle may be coupled with the module 1106 at any location such that a person or a machine can grip the handle when installing or removing the module 1106. In another embodiment, the gripping component 1108 is a magnet such that a person or a machine can gain control of the module 1106 by engaging the magnet. In another embodiment, the gripping component 1108 is a machinery pocket (e.g., a forklift pocket) such that a machine can control the placement and orientation of the module 1106 such that the machine can perform at least one of inserting the module 1106 into the internal cavity 1104 of the battery box 1002 and removing the module 1106 from the internal cavity 1104 of the battery box 1002.

The module 1106 may be configured to provide energy to the vehicle 10 to facilitate the operation of the components of the vehicle 10. In some embodiments, the vehicle 10 is refuse vehicle 100 including a lift assembly 108. The energy from the module 1106 may be used to operate the lift assembly 108 of the refuse vehicle 100. The battery box 1002 may be configured to transfer the energy from the module 1106 to the components of the vehicle 10.

Figure 16:
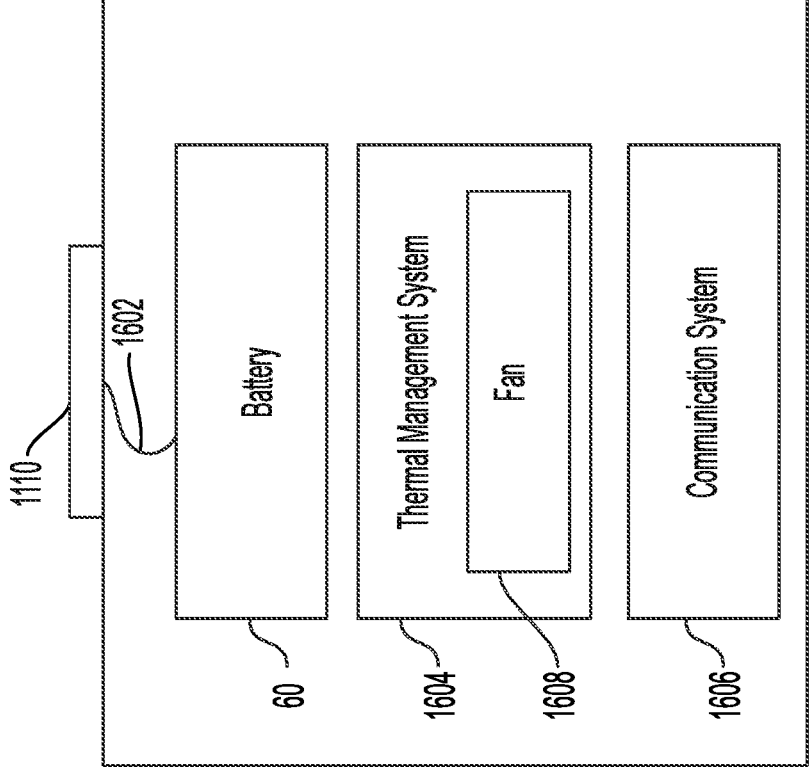
FIG. 16 is a schematic diagram of a module of the vehicle of FIG. 1, according to an exemplary embodiment.
Figure 16:

The module 1106 may include a plurality of internal components and systems. According to an exemplary embodiment, as shown in FIG. 16, the module 1106 includes an electrical energy storage device (e.g., battery 60), associated cabling 1602, a thermal management system 1604, and a communication system 1606. The battery 60 may be configured to provide power or energy to the module 1106 to be provided to a component or system. The associated cabling 1602 may connect the battery 60 to a module terminal 1110 or other component of the module 1106 such that energy can be transferred between components via the cabling 1602. The thermal management system 1604 may control a temperature within the module 1106. In some embodiments, the thermal management system 1604 includes at least one fan 1608 to cool the module 1106. The communication system 1606 may facilitate communication between the module 1106 and external systems. In some embodiments, the communication system 1606 may transmit a signal to an external computing system indicating a state of the module 1106 (e.g., low power, faulty component, etc.) In some embodiments, the module 1106 includes other components and systems. In some embodiments, the module 1106 includes any combination of systems and components. The module 1106 may be configured to be assembled off the vehicle 10 and then installed as a single unit. According to an exemplary embodiment, the battery box 1002 is configured to include a single module 1106. As such, if one component of the module 1106 needs replacing, repair, etc., the module 1106 and any components contained therein may be removed from the vehicle 10 by removing the single module 1106 from the internal cavity 1104 of the battery box 1002. In another embodiment, as shown in FIG. 11A, the internal cavity 1104 of the battery box 1002 is configured to receive a plurality of modules 1106. Each module 1106 can include separate electrical energy storage devices, wiring, systems, etc. With a plurality of modules 1106, if a component of one module 1106 needs to be charged, repaired, replaced, etc., the module 1106 may be removed from the battery box 1002 while the remaining modules 1106 can stay in the battery box 1002. In some embodiments, the installation and removal of a first module 1106 is independent from the installation and removal of a second module 1106. If the electrical energy storage devices in the first module 1106 run out of energy, the first module 1106 may be removed from the battery box 1002. The electrical energy storage device in the first module 1106 may be charged or replaced such that the first module 1106 can be reinstalled in the battery box 1002, or the first module 1106 can be replaced with a second module 1106 with an already-charged battery.

According to an exemplary embodiment, the battery box 1102 is configured to receive supplemental energy when the energy of a module 1106 is low or depleted. In some embodiments, supplemental energy includes recharging an electrical energy storage device. In other embodiments, supplemental energy includes replacing an electrical energy storage device, or replacing a module 1106. According to an exemplary embodiment, the battery box 1002 is configured to recharge a battery 60 via an external electrical power source (e.g., a generator) when the battery 60 no longer has energy to provide to the components of a vehicle 10. The battery box 1002 may also be configured to replace the battery 60 with a new, already-charged, battery 60 by removing the module 1106 from the battery box 1002, removing a first battery 60, and replacing the first battery 60 with a second battery 60. The battery box 1002 may also be configured to replace an entire module 1106. According to an exemplary embodiment, a first module 1106 is replaced with a second module 1106 with already-charged batteries 60 when multiple batteries 60 within the first module 1106 are low on energy.

According to an exemplary embodiment, the shell 1102 of the battery box 1002 is configured to protect and regulate the components disposed in the battery box 1002. The battery box 1002 may be configured to protect the module 1106 from external elements including, but not limited to, water, salt, dust, mud, and debris. In some embodiments, the shell 1102 creates an air-tight seal around the internal cavity 1104 such that no external elements can come into contact with the module 1106 or any other components or systems disposed within the battery box 1002. In some embodiments, the shell 1102 includes module protection 1028 that protect the modules 1106 within the battery box 1002. The module protection 1028 may provide impact protection to the module 1106 and any other internal components. In some embodiments, the module protection 1028 may be a material, a layer of material, or other impact-resistant devices (e.g., springs) configured to lessen or dampen the impact of a force such that the module 1106 is not broken or damaged when undergoing external forces. In some embodiments, the shell 1102 includes module protection 1028 that thermally insulates the module 1106 and other internal components from outside ambient conditions. The shell 1102 may comprise a material, or a layer of material, that insulates the internal cavity 1104 such that the temperature and humidity within the internal cavity 1104 are not affected by the temperature and humidity outside of the battery box 1002. In some embodiments, the module protection 1028 is be disposed along at least a portion of an inner wall of the shell.

According to an exemplary embodiment, the battery box 1002 is configured such that a component of the vehicle 10 can operate when at least one module 1106 is missing from the battery box 1002 (e.g., part of the internal cavity 1104 of the battery box 1002 designated for a module 1106 is empty) or the batteries 60 in the module 1106 are out of energy. In some embodiments, a battery box 1002 includes a plurality of modules 1106. The plurality of modules 1106 may include a first module 1106, a second module 1106, and a third module 1106. If the first module 1106 is removed, or the batteries 60 within the first module 1106 run out of energy, the energy from the second and third modules 1106 may still be transferred to the components of the vehicle 10. If that energy is enough to operate the components, then operation can continue.

The operation of the components of the vehicle 10 may also depend on how the energy from the modules 1106 in the battery box 1002 is distributed. According to an exemplary embodiment, each module 1106 within a plurality of modules 1106 provides energy directly to a designated component. In some embodiments, a first module 1106 is configured to power a lift assembly 108 of a refuse vehicle 100 and a second module 1106 is configured to power a tailgate 132 of the same refuse vehicle 100. As such, if the first module 1106 runs out of energy, the tailgate 132 can still operate, but the lift assembly 108 cannot.

Figure 17:
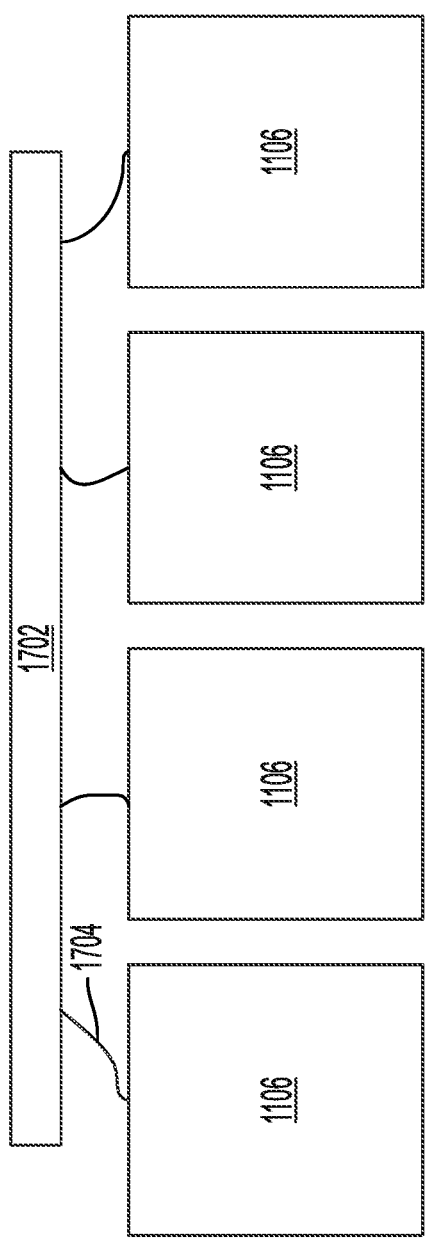
FIG. 17 is a schematic diagram of a power distribution unit of the vehicle of FIG. 1, according to an exemplary embodiment.

In some embodiments, as shown in FIG. 17, the battery box 1002 includes a power distribution unit 1702 (e.g., a power bus). The power distribution unit may be configured to receive energy from the plurality of modules 1106 and selectively direct the energy to the components of the vehicle 10 to be operated. In some embodiments, a first module 1106 and a second module 1106 are electrically coupled with a power distribution unit 1702. The first and second module 1106 may be electrically coupled with the power distribution unit 1702 via a cable 1704 (e.g., a wire), terminals (e.g., a module terminal 1110 and a system terminal 1112), etc. The power distribution unit 1702 may be configured to receive energy from the first module 1106 and the second module 1106 and selectively direct the energy from the first module 1106 and the second module 1106 to at least one component of the vehicle 10 to be operated. If the first module 1106 (corresponding to the lift assembly 108) has no remaining energy or is missing from the battery box 1002, the energy from the second module 1106 may be used to operate the lift assembly 108.

According to an exemplary embodiment, the module 1106 includes at least one module terminal 1110. The module terminal 1110 may be configured to facilitate the transfer of energy from the batteries 60 in the module 1106 to the components of the vehicle 10. In some embodiments, the module terminal 1110 comprises a conductive material such that the energy from the battery 60 can be transferred through the module terminal 1110 to a receiving terminal. As such an embodiment, like a typical battery, the module terminal 1110 can have a positive terminal and a negative terminal configured to connect to a receiving terminal. The battery box 1002 may include at least one receiving terminal, shown as system terminal 1112. The system terminal 1112 may be configured to contact a module terminal 1110 of a module 1106 to facilitate the transfer of energy from the module 1106 to a component of the vehicle 10. The system terminal 1112 may comprise a conductive material such that the system terminal 1112 can be configured to receive the energy from the module 1106. In some embodiments, the system terminal 1112 is a bus bar such that contact made with the module terminal 1110 can be made at different locations along the system terminal 1112. To transfer the energy from the battery 60 to the components of the vehicle 10, module 1106 may be configured such that the module terminal 1110 contacts the system terminal 1112 when properly positioned within the battery box 1002. The module terminal 1110 may be any shape or size capable of sufficiently contacting the system terminal 1112 to facilitate the transfer of energy. Similarly, the system terminal 1112 may be any shape or size. In one exemplary embodiment, the battery box 1002 includes a single system terminal 1112 configured to contact the module terminal 1110 of each module 1106 (e.g., one large system terminal 1112 extending the longitudinal length of the battery box 1002 contacting a plurality of module terminals 1110). In another embodiment, the battery box 1002 includes a plurality of system terminals 1112 wherein each system terminal 1112 corresponds to an individual module terminal 1110 (e.g., a first system terminal 1112 contacts a first module terminal 1110). In another embodiment, a single system terminal 1112 corresponds to a subset of a plurality of module terminals 1110 (e.g., a first system terminal 1112 contacts a first subset of a plurality of module terminals 1110 and a second system terminal 1112 contacts a second subset of the plurality of module terminals 1110). The system terminal 1112 may be configured such that a module terminal 1110 can contact the system terminal 1112 at different locations. According to an exemplary embodiment, a first module 1106 has a module terminal 1110 that contacts a corresponding system terminal 1112 at a center of the system terminal 1112. In other embodiments, the first module 1106 is replaced with a second module 1106 and the second module 1106 has a module terminal 1110 that contacts the corresponding system terminal 1112 at a location offset from the center of the system terminal 1112.

In another exemplary embodiment, a system terminal 1112 is configured to receive energy from a plurality of modules 1106 while only contacting one module terminal 1110. In some embodiments, modules 1106 are connected in series such that energy flows from a first module 1106 to a second module 1106. The first module 1106 may include a module terminal 1110. The second module 1106 may include two module terminals 1110. A receiving module terminal 1110 of the second module 1106 may contact the module terminal 1110 of the first module 1106. A supplying module terminal 1110 of the second module 1106 may contact either a module terminal 1110 of a third module 1106 or a system terminal 1112 of the battery box 1002. The energy may be transferred between any number of modules 1106 before being transferred to the vehicle 10 via the system terminal 1112.

Figure 18:
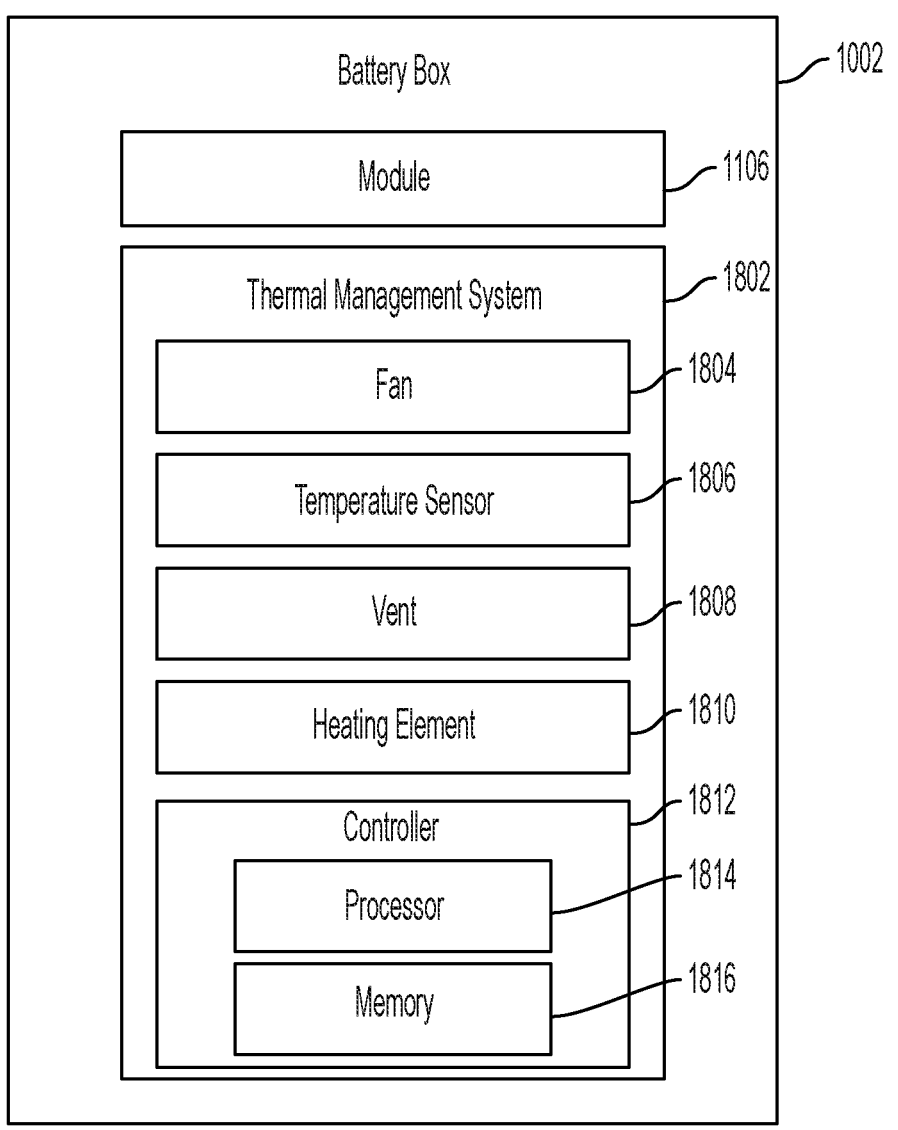
FIG. 18 is a schematic diagram of a battery box of the vehicle of FIG. 1, according to an exemplary embodiment.

According to an exemplary embodiment, as shown in FIG. 18, the battery box 1002 includes a thermal management system 1802. The thermal management system 1802 may include various components to control a temperature within the internal cavity 1104 of the battery box. In some embodiments, the thermal management system 1802 includes at least one of a fan 1804, a temperature sensor 1806, a vent 1808, and a heating element 1810. The thermal management system 1802 may include a controller 1812. The controller 1812 may have a processor 1814 and a memory 1816 to facilitate actuation of the various components of the thermal management system 1802. For example, the memory 1816 may store instructions that include thresholds that dictate when certain components are to be actuated. The processor 1814 may receive and analyze various inputs and determine which component to actuate. For example, the processors 1814 may receive a signal from temperature sensor 1806 indicating a temperature above a threshold stored in the memory 1816, and send a signal to actuate the fan 1804. In some embodiments, heat from systems disposed within the battery box 1002, from the environment external to the battery box 1002, etc. may cause a temperature of the internal cavity 1104 of the battery box 1002 to increase to a temperature that can be problematic or harmful to the components within the battery box 1002. In some embodiments, the thermal management system 1802 includes a temperature sensor 1806 disposed within the internal cavity 1104 of the battery box 1002. The temperature sensor 1806 may be configured to detect the temperature and cause a components of the thermal management system 1802 to activate to counteract the increase in temperature. In some embodiments, a detection of a temperature above ninety degrees causes the controller 1812 to actuate a fan 1804 disposed in the internal cavity 1104 of the battery box 1002 to blow air over the modules 1106 and other systems disposed in the battery box 1002 to cool the components down.

In some embodiments, detecting the temperature causes the controller 1812 to open a vent 1808 such that the hot air can escape from the battery box 1002. The thermal management system 1802 may also increase the temperature within the internal cavity 1104 of the battery box 1002 when the surrounding temperature is so low it negatively affects the internal components of the battery box 102. According to an exemplary embodiment, a temperature sensor detects the low temperature within the internal cavity 1104 and the controller 1812 of the thermal management system 1802 actuates a heating element 1810 (e.g., a resistive heater, an electric heater, a heat exchanger, etc.) to provide heat to the internal cavity 1104. The thermal management system 1802 may include any variety of components configured to regulate the temperature within the internal cavity 1104 of the battery box 1002.

According to an exemplary embodiment, the battery box 1002 includes at least one mounting provision 1114. The mounting provision 1114 may be configured to facilitate the positioning of a module 1106 within the internal cavity 1104 of the battery box 1002 such that energy from the module 1106 can be transferred to the components of the vehicle 10. In some embodiments, the mounting provision 1114 facilitates the proper placement of the module 1106 such that the module terminal 1110 of the module 1106 contacts the system terminal 1112 of the battery box 1002. In some embodiments, the mounting provision 1114 is a guide configured to direct a module 1106 toward a desired location within the battery box 1002. The guide may be a wall or plate configured to create at least one compartment 1126 within the battery box 1002. Each wall may be arranged to create a compartment 1126 with a shape and size to accommodate a module 1106. In some embodiments, a plurality of walls extend laterally from a left side 1020 of the battery box 1002 to a right side 1018 of the battery box 1002 such that a module 1106 can slide between the walls. A compartment 1126 may be defined by the space between at least two walls or between a wall and the shell 1102 of the battery box 1002. The sizes of the compartments 1126 may vary depending, in part, on the size of the module 1106 it is intended to accommodate. Modules 1106, and therefore the compartments 1126, may have any shape or size.

In some embodiments, the size of the module 1106 may be based, at least in part, on the size of the battery box 1002. For example, as shown in FIG. 11A, the first portion 1022 of the battery box 1002 has a greater width 1016 than the second portion 1024 and the third portion 1026. A module 1106 disposed in the first portion 1022 may have a first module width 1128 and a module 1106 disposed in the second portion 1024 may have a second module width 1128. The first module width may be greater than the second module width 1128. The module 1106 may extend the full width 1016 of the battery box 1002 or just part of the width 1016 such that the module width 1128 may be less than or equal to the width 1016 of the battery box 1002. As shown in FIG. 11B, the first portion 1022 of the battery box 1002 has a greater depth 1010 than the second portion 1024 and the third portion 1026. A module 1106 disposed in the first portion 1022 may have a first module height 1130 and a module 1106 disposed in the second portion 1024 may have a second module height 1130. The first module height 1130 may be greater than the second module height 1130. The module 1106 may extend the full depth 1010 of the battery box 1002 or just part of the depth 1010 such that the module height 1130 may be less than or equal to the depth 1010 of the battery box 1002.

According to an exemplary embodiment, a battery box 1002 comprising a wall as a mounting provision 1114 has the system terminal 1112 disposed on the wall. The module terminal 1110 may be disposed on a side of the module 1106 that opposes the wall such that the module terminal 1110 contacts the system terminal 1112 when the module 1106 slides along the wall. The system terminal 1112 may also be disposed at different locations within the battery box 1002. In some embodiments, the system terminal 1112 is on any side of the internal cavity 1104 of the battery box 1002 (e.g., top, bottom, left side, right side, front side, back side). A location of the module terminal 1110 on the module 1106 may depend, in part, on a location of the system terminal 1112 in the battery box 1002. In some embodiments, the module terminal 1110 is on top of the module 1106 when the system terminal 1112 is on the top of the internal cavity 1104 of the battery box 1002. In some embodiments, the module 1106 can be reoriented depending on the location of the system terminal 1112. In such an embodiment, a single module 1106 can be used with system terminals 1112 at any location within the battery box 1002. The module 1106 may be reoriented (e.g., turned, flipped) such that the module terminal 1110 is facing an appropriate direction to contact the system terminal 1112. In one embodiment, a first side of a module 1106 includes a module terminal 1110. A top of the internal cavity 1104 includes a system terminal 1112. The first side of the module 1106 may be directed toward the top of the internal cavity 1104 such that the module terminal 1110 can contact the system terminal 1112. If the module 1106 is disposed in a different portion of the battery box 1002, or in a different battery box 1002 entirely, and the system module 1112 is on a bottom of the internal cavity 1104, the module 1106 may be flipped such that the first side is directed toward the bottom of the internal cavity 1104.

Figure 12A:
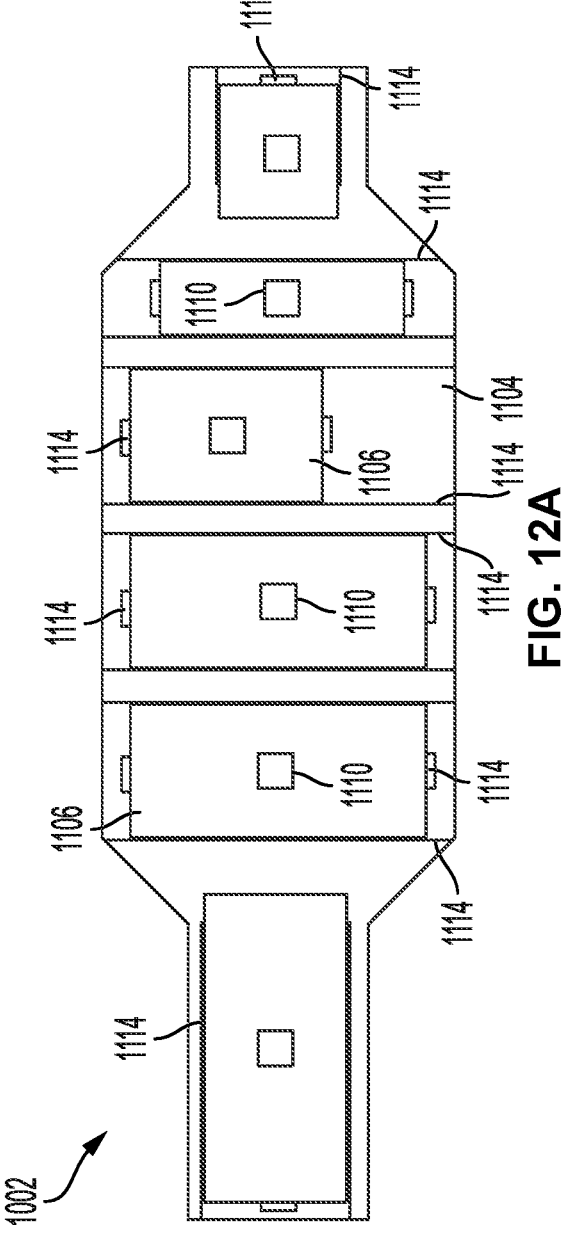
FIG. 12A is a top view of an internal cavity of a battery box of the vehicle of FIG. 1, according to another exemplary embodiment.

According to another exemplary embodiment, as shown in FIG. 12A, the mounting provision 1114 of the battery box 1002 is a track or rail. Similar to the wall in FIG. 11A, the track may guide the placement of the module 1106 such that the energy from the module 1106 can be transferred to the components of the vehicle 10 (e.g., the module terminal 1110 contacts the system terminal 1112). In an exemplary embodiment, the system terminal 1112 is disposed on the top of the internal cavity 1104 of the battery box 1002 with a corresponding module terminal 1110 being disposed on the top of a module 1106. Any mounting provision 1114 may be positioned directly next to another guide, spaced apart, extend in different direction, or have any other varied configuration. In some embodiments, a battery box 1002 includes a variety of mounting provisions 1114 (e.g., including both tracks and walls, among others).

In some embodiments, the battery box 1002 includes other mounting provisions 1114 to facilitate proper placement and securing of the modules 1106. The mounting provision 1114 may be any structural element configured to limit the movement of the module 1106 and keep the module 1106 at a specific location within the battery box 1002. As shown in FIG. 12A, the mounting provision 1114 is a movable member disposed at an end of a module 1106. The movable member may be configured to move between a loading position (e.g., flush with the bottom of the internal cavity 1104 of the battery box 1002) and a locking position (e.g., extending above the bottom of the internal cavity 1104 of the battery box 1002). In such an embodiment, when installing a module 1106 into a battery box 1002, an installer may push the movable member down into the loading position such that the path to slide the module 1106 into the battery box 1002 is unobscured. Once the module 1106 is far enough into the battery box 1002 such that the end of the module 1106 passes the location of the movable member, the movable member may bias back up into the locking position. To remove the module 1106, the installer may push the movable member down again and slide the module 1106 out of the battery box 1002 over the location of the movable member. Once the module 1106 is no longer above the movable member, the movable member may be biased up into the locking position again. The movement of the movable member, in either direction, can be done manually or by a biasing force (e.g., a spring).

According to another exemplary embodiment, a mounting provision 1114 includes a retractable pin and a corresponding receiver. A module 1106 may include a retractable pin on the bottom of the module 1106. The pin may be biased to extend downward from the bottom of the module 1106, and may be retracted into the module 1106 when force is applied (e.g., being pushed, connected to a button/lever on the module). In some embodiments, as a module 1106 moves along the bottom of the internal cavity 1104 of the battery box 1002, the force from the bottom of the internal cavity 1104 forces the pin to the retracted position. The pin may correspond to a receiver (e.g., an aperture or hole) in the battery box 1002 such that when the pin aligns with the receiver, the pin biases to its extended position. When the pin is in the receiver, the module 1106 may no longer move until the pin is retracted. A module 1106 may include any number, any combination, and any arrangement of mounting provisions 1114 to facilitate the proper placement of the module 1106 in the battery box 1002. Other mounting provisions 1114 may include various fasteners (e.g., magnets, bolts, screws, loops and hooks, straps) and other structures defining a location where a module 1106 can be positioned.

According to an exemplary embodiment, the battery box 1002 includes integrated impact protection for all enclosed systems within the battery box 1002. The battery box 1002 may include cushioning material, springs, etc. configured to protect the enclosed systems (e.g., the module 1106, wiring, power distribution unit) from damage from the vehicle 10 bouncing or vibrating due to rough terrain or from the vehicle 10 getting hit from other external forces (e.g., getting into a car crash). The integrated impact protection may be incorporated on one, all, or some of the sides of the internal cavity 1104 of the battery box 1002. The impact protection may be incorporated between systems and components disposed within the battery box 1002.

According to an exemplary embodiment, as shown in FIG. 11B, which is a side view of the battery box 1002 of FIG. 11A the battery box 1002 includes mounting provisions 1114 in the form of walls. The system terminals 1112 are be coupled with the walls 1114. The module terminals 1110 are coupled with a side of the modules 1106. In some embodiments, the battery box 1002 is configured to include various sizes of modules 1106 and organize the modules 1106 in various arrangements. In some exemplary embodiments, a first module 1106 is stacked on top of a second module 1106 within the same compartment 1126 (e.g., between two adjacent walls 1114). The first module 1106 may be supported by the second module 1106. In another embodiment, the first module 1106 is separated from the second module 1106 by another structural element (e.g., a shelf). In another embodiment, some modules 1106 extend from the bottom of the internal cavity 1104 of the battery box 1002 to the top of the internal cavity 1104, while others extend only part way, or others extend starting at an elevation above the bottom of the internal cavity 1104.

Figure 12B:
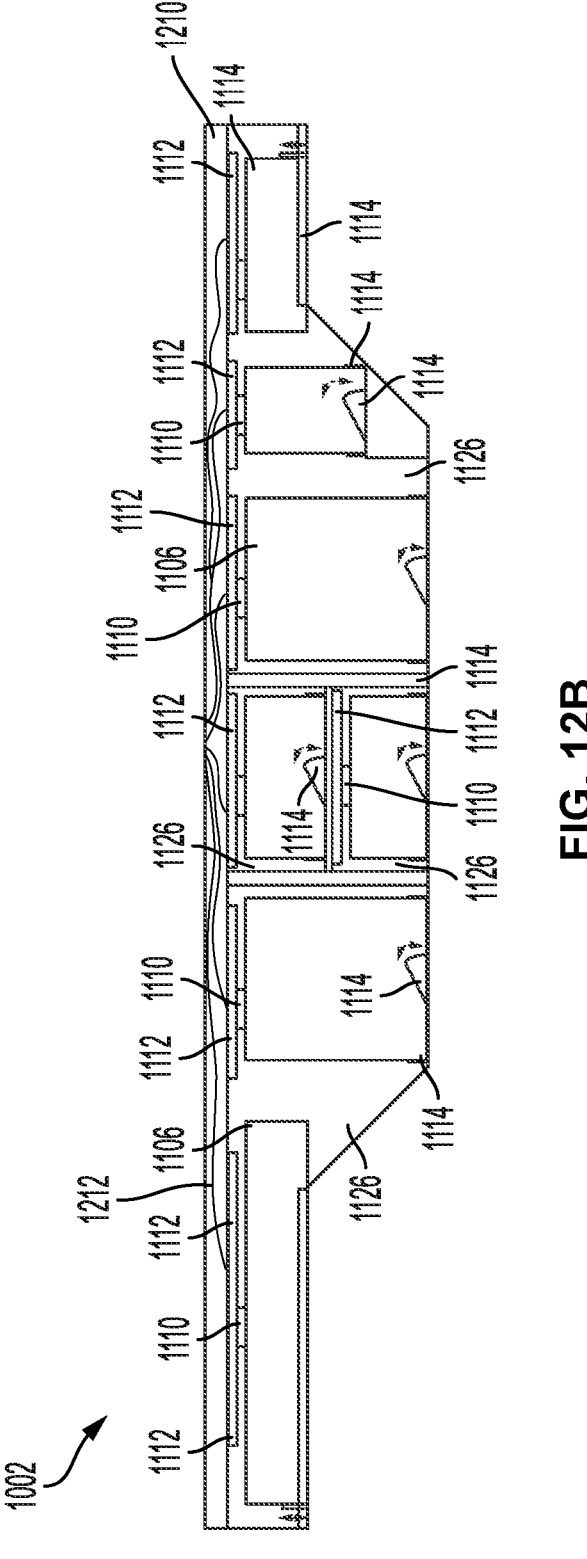
FIG. 12B is a side view of an internal cavity of a battery box of the vehicle of FIG. 1, according to another exemplary embodiment.

According to another exemplary embodiment, as shown in FIG. 12B, the battery box 1002 includes a combination of mounting provisions 1114 (e.g., a track and a wall). The system terminals 1112 are coupled with a top of the internal cavity 1104 of the battery box 1002 or an internal shelf if a first module 1106 is to be stacked on top of a second module 1106. The module terminals 1110 are coupled with a top of the modules 1106. In another embodiment, when the first module 1106 is supported only by the second module 1106, the first module 1106 includes two module terminals 1110. A receiving module terminal 1110 may be on a bottom of the first module 1106 and a supplying module terminal 1110 may be on a top of the first module 1106. The battery box 1002 may also include other mounting provisions 1114, such as the movable member configured to move from a loading position to a locking position, among others.

According to an exemplary embodiment, the battery box 1002 includes system routing pathways 1210 to route wire 1212 between appropriate components in order to transfer the energy from the modules 1106 to the appropriate location (e.g., component of the vehicle, power distribution unit). In some embodiments, the battery box 1002 includes conduits within the battery box 1002 connecting different systems within the battery box 1002 to each other. As shown in FIG. 12A, a wall is the system routing pathway that contains the wiring 1212 and routes the wiring 1212 to a desired location. In another embodiment, as show in FIG. 12B, the system routing pathway 1210 is a separate compartment where any wiring 1212 needed to connect the system terminals 1112 to a destination can be contained. The compartment may disposed on top of the battery box 1002 where wiring 1212 may be disposed in order to direct the energy from the modules 1106 to either a power distribution unit or directly to a component of the vehicle 10. The power distribution unit may be contained within the battery box 1002, or it can be external to the battery box 1002.

Figures 13A, 13B, 13C:
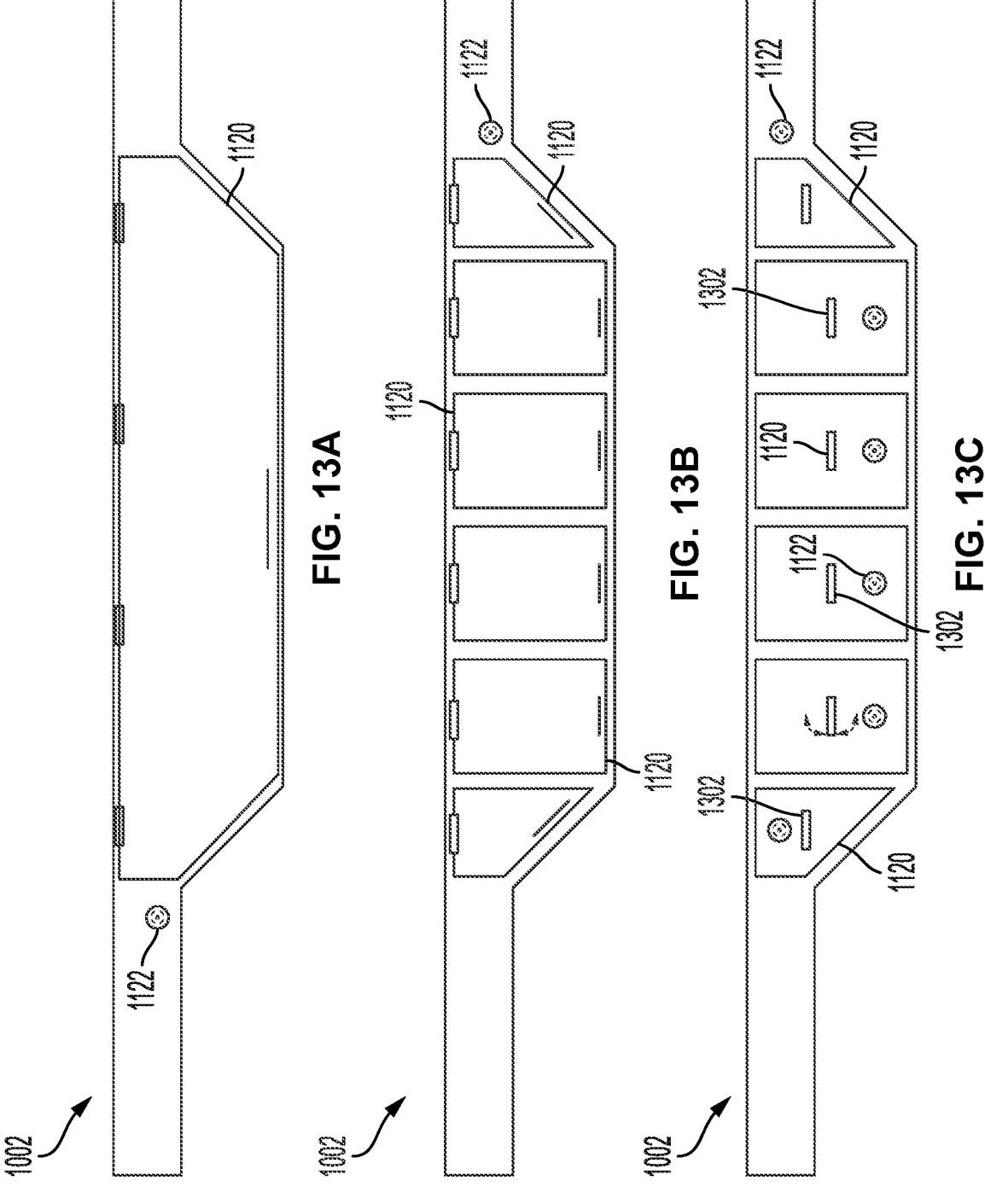
FIG. 13A is a side view of a battery box of the vehicle of FIG. 1, according to an exemplary embodiment.
FIG. 13B is a side view of a battery box of the vehicle of FIG. 1, according to another exemplary embodiment.
FIG. 13C is a side view of a battery box of the vehicle of FIG. 1, according to another exemplary embodiment.

According to an exemplary embodiment, as shown in FIGS. 13A-13C, the battery box 1002 includes at least one sealing mechanism 1120. The sealing mechanism 1120 may be configured to allow or prevent installation and removal of modules 1106. The sealing mechanism 1120 may be configured to protect the internal cavity 1104 of the battery box 1002 and any contents therein (e.g., modules 1106) from water, salt, dust, mud, debris, among others. In some embodiments, the sealing mechanism 1120 includes a door configured to swing open and closed. In other embodiments, the sealing mechanism 1120 includes a panel configured to be secured and removed. In yet other embodiments, the sealing mechanism 1120 includes a locking mechanism configured to create and release airtight seals. As shown in FIG. 13A, the battery box 1002 includes a door configured to open and close when a module 1106 is to be installed or removed from the battery box 1002. In one embodiment, the door is rotatably coupled with the battery box 1002 by a hinge. The door may be configured to open and close by rotating around a hinge axis. The hinge may be on any side of the door. In one embodiment, the hinge is at the top of the door such that the door flips up when opening and down when closing. In other embodiments, the hinge is placed on other sides of the door such that the door opens and closes in different directions. According to an exemplary embodiment, as shown in FIG. 13A, the battery box 1002 includes only one door such that opening the door can provide access to any module 1106 within the battery box 1002. In another exemplary embodiment, as shown in FIG. 13B, the battery box 1002 includes separate doors for each module 1106 (e.g., opening a first door provides access to a first module and opening a second door provides access to a second module) or a subset of a plurality of modules 1106 (e.g., opening a first door provides access to a first module and a second module and opening a second door provides access to a third and fourth module).

According to another exemplary embodiment, as shown in FIG. 13C, the sealing mechanism 1120 is a locking mechanism integrated with the module 1106. The locking mechanism may be coupled with an exterior surface of the module 1106 where the exterior surface of the module 1106 creates part of the shell 1102 the battery box 1002 (e.g., the exterior surface of the module 1106 is flush with the shell 1102 of the battery box 1002). The locking mechanism may cause, when activated, the exterior surface of the module 1106 to create an airtight seal with the shell 1102 of the battery box 1002. In some embodiments, the module 1106 has a handle 1302 on the exterior surface. Once positioned appropriately within the battery box 1002, the handle 1302 may be configured to move from an unlocked position to a locked positioned. The locked position may be configured to secure the module 1106 in place and create an airtight seal between the module 1106 and the battery box 1002. The locking mechanism may be configured to release the airtight seal when the handle 1302 is moved from the locked position to the unlocked position.

The sealing mechanisms 1120 as described may be on one, some, or all sides of the battery box 1002. The sealing mechanisms 1120 may be disposed on the left side 1020, the right side 1018, the front side 1012, or the back side 1014 of the battery box 1002, or any combination thereof. According to an exemplary embodiment, a module 1106 is accessible from both a first side (e.g., the left side 1020) and a second side (e.g., the right side 1018) of the battery box 1002. In other embodiments, a first module 1106 and a second module 1106 are accessible from the first side of the battery box 1002 and the second side of the battery box 1002. In another embodiment, the first module 1106 is accessible from the first side of the battery box 1002 and the second module 1106 is accessible from the second side of the battery box 1002.

According to an exemplary embodiment, the battery box 1002 includes at least one charge port 1122. The charge port 1122 may be configured to receive an electrical input from an external power source. The electrical power source may be any device capable of transferring energy to another device (e.g., a generator, battery, etc.). The charge port 1122 may be further configured to provide the electrical input to a module 1106 to charge at least one battery 60 of the module 1106 when the module 1106 is disposed within the internal cavity 1104 of the battery box 1002. As such, instead of having to replace the batteries 60, the batteries 60 may be recharged. According to an exemplary embodiment, as shown in FIGS. 13A and 13B, the battery box 1002 includes a charge port 1122 configured to receive an electrical input from a power source (e.g., a generator) such that a battery 60 can be charged when the module 1106 is disposed within the battery box 1002. The charge port 1122 may be electrically coupled (either directly or indirectly) with each module 1106 such that energy received by the charge port 1122 may charge any battery 60 within the battery box 1002. In another embodiment, as shown in FIG. 13C, the battery box 1002 includes a plurality of charge ports 1122. A first charge port 1122 may be configured to provide energy to a first module 1106 and a second charge port 1122 may be configured to provide energy to a second module 1106. In another embodiment, the first charge port 1122 is configured to provide energy to a first subset of modules 1106 and a second charge port 1122 is configured to provide energy to a second subset of modules 1106.

Figure 14A:
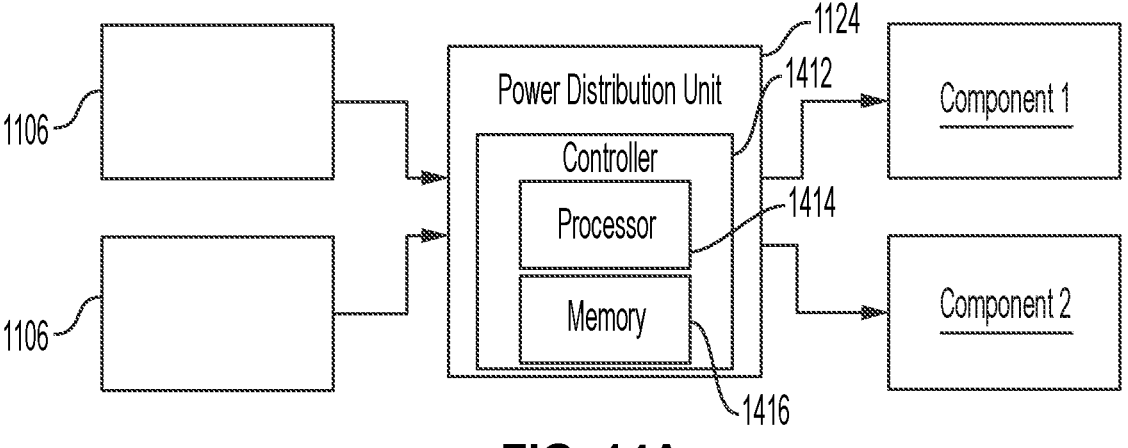
FIG. 14A is a schematic diagram of an energy transfer from a module to a component of the vehicle of FIG. 1, according to an exemplary embodiment.
Figure 14B:
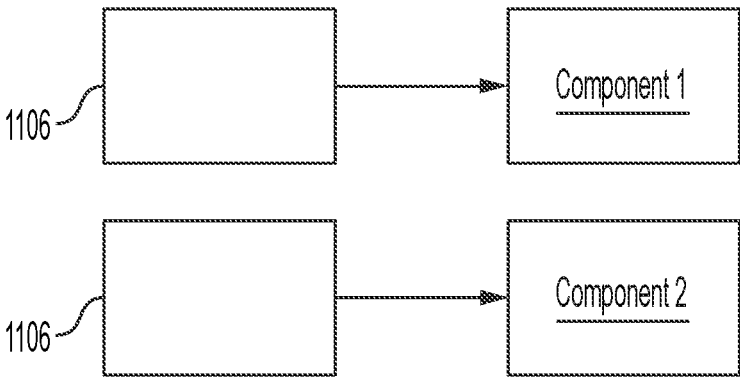
FIG. 14B is a schematic diagram of an energy transfer from a module to a component of the vehicle of FIG. 1, according to another exemplary embodiment.

According to an exemplary embodiment, as shown in FIGS. 14A-14B, a battery box 1002 is configured to receive energy from a module 1106 and selectively direct the energy to components of the vehicle 10 (e.g., a tailgate, a lift system). According to an exemplary embodiment, as shown in FIG. 14A, the battery box 1002 includes at least one power distribution unit 1124. The power distribution unit 1124 may include a controller 1412. The controller 1214 may include a processor 1414 and a memory 1416 to facilitate distribution of power to components. For example, the memory 1416 may include instructions that dictate which component to direct power to. The processor 1414 may receive and analyze various inputs and direct power to a component(s) based on the inputs and the instructions. The power distribution unit 1124 may be configured to receive an electrical input from at least one module 1106. In some embodiments, a first module 1106 is electrically coupled with the power distribution unit 1124 such that energy from the battery 60 disposed in the first module 1106 can be transferred to the power distribution unit 1124. A second module 1106 may also be electrically coupled with the power distribution unit 1124 such that energy from the battery 60 disposed in the second module 1106 can be transferred to the power distribution unit 1124. The power distribution unit 1124 may be configured to selectively direct the energy received from the first module 1106 and the energy received from the second module 1106 to at least one component of the vehicle 10 to be operated. According to an exemplary embodiment, the power distribution unit 1124 is configured to direct energy to a tailgate 132 of a refuse vehicle 100. The power distribution unit 1124 may also be configured to direct energy to a lift assembly 108 of the refuse vehicle 100. The power distribution unit 1124 may be configured to provide energy to only one component at a time. In other embodiments, the power distribution unit 1124 is configured to provide energy to a plurality of components simultaneously. According to another exemplary embodiment, the battery box 1002 includes a plurality of power distribution units 1124 such that each power distribution unit 1124 can be configured to receive an electrical input from a subset of the plurality of modules 1106. The subset of the plurality of modules 1106 may include a single module 1106 or several modules 1106. The power distribution unit 1124 may facilitate the distribution of energy to components of the vehicle 10 even when a module 1106 is out of energy. In some embodiments, when a first module 1106 is out of energy and a second module 1106 and a third module 1106 still have energy, the power distribution unit 1124 directs the energy to the component to be operated.

According to another exemplary embodiment, as shown in FIG. 14B, the battery box 1002 is configured such that a module 1106 has an associated component (e.g., a component electrically coupled to the module 1106). Energy from the module 1106 may be directed to the associated component. In some embodiments, a module 1106 provides energy directly to a tailgate 132 of a refuse vehicle 100. If the module 1106 runs out of energy, the tailgate 132 can no longer operate. In another embodiment, a plurality of modules 1106 are associated with the same component. A first module 1106 and a second module 1106 may be associated with the tailgate 132 of the refuse vehicle 100. If the first module 1106 runs out of energy, the tailgate 132 can still operate on the energy from the second module 1106. According to another exemplary embodiment, a module

1106 supplies energy to a plurality of components. The module 1106 may provide energy to the tailgate 132 and a lift assembly 108. If the module 1106 runs out of energy, the tailgate 132 and the lift assembly 108 can be inoperable, unless associated with a second module 1106.

Figure 15:
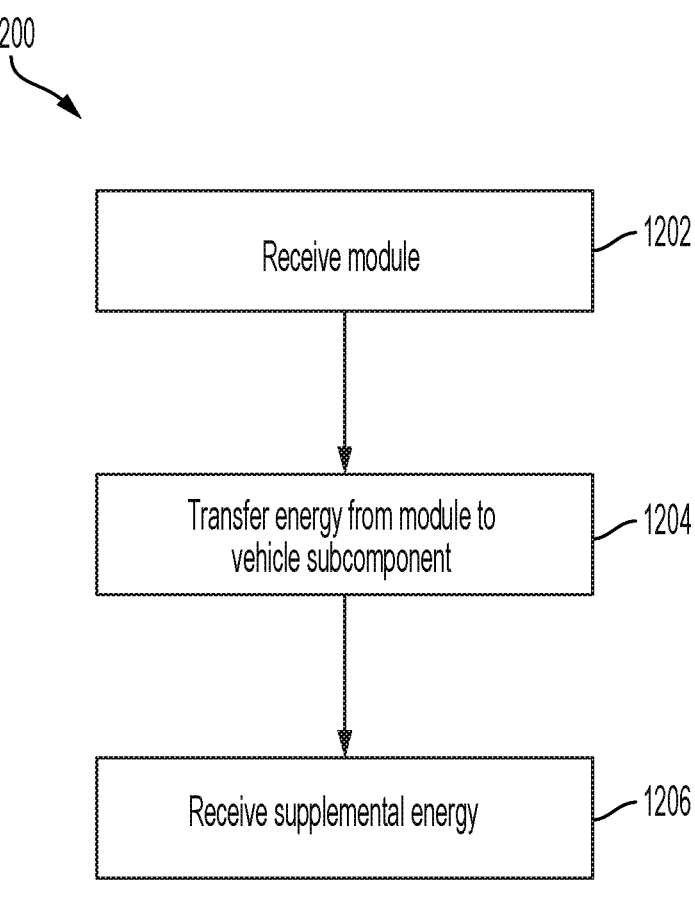
FIG. 15 is a flow diagram of a method of providing energy to at least one component of the vehicle of FIG. 1, according to an exemplary embodiment.

According to an exemplary embodiment, as shown in FIG. 15, method 1200 provides energy to at least one component of a vehicle 10. At operation 1202, a chassis 20 of a vehicle 10 receives a module 1106. At operation 1204, the chassis 20 transfers energy from the module 1106 to at least one component of the vehicle 10. At operation 1206, the chassis 20 receives supplemental energy. In some embodiments, operation 1202 includes a battery box 1002 of the chassis 20 receiving a module 1106. Receiving the module 1106 may include the module 1106 entering an internal cavity 1104 of the battery box 1002 and positioning the module 1106 within the battery box 1002 such that energy can be transferred from or to the module 1106. The module 1106 may be disposed within the battery box 1002 and positioned such that a module terminal 1110 of the module 1106 contacts a system terminal 1112 of the battery box 1002. Contact between the module terminal 1110 and the system terminal 1112 facilitates the transfer of energy from the module 1106 to the battery box 1002 and then to the components of the vehicle 10. In another embodiment, a first module 1106 with a supplying module terminal 1110 is positioned such that the supplying module terminal 1110 contacts a receiving module terminal 1110 of a second module 1106. The first module 1106 and the second module 1106 may be connected in series such that energy from the first module 1106 can transfer through the second module 1106 before transferring to the battery box 1002 or to a third module 1106. According to an exemplary embodiment, the second module 1106 includes a supplying module terminal 1110 to contact at least one of a receiving module terminal 1110 of a third module 1106 and the system terminal 1112 of the battery box 1002. A mounting provision 1114 may facilitate the positioning of the module 1106 within the battery box 1002. The mounting provision 1114 may be a track or a wall along which the module 1106 can slide when entering, or leaving, the battery box 1002.

In some embodiments, receiving the module 1106 at operation 1202 includes locking the module 1106 in an appropriate position. The battery box 1002 may include a mounting provision 1114 configured to keep the module 1106 stationary relative to the battery box 1002. The mounting provision 1114 may be any structural element that limits the movement of the module 1106 when disposed in the internal cavity 1104 of the battery box 1002. According to an exemplary embodiment, the mounting provision 1114 is a ridge beyond which the module 1106 cannot slide. In other embodiments, the mounting provision 1114 is a receiver configured to receive a pin coupled with the module 1106 when aligned properly or a movable member configured to move between a loading position and a locking position, among others.

According to an exemplary embodiment, at operation 1204 the chassis 20 transfers energy from the module 1106 to at least one component of the vehicle 10. The transfer of energy may be direct from the module 1106 to the component, or it can be indirect. In some embodiments, a module 1106 is electrically coupled with a component via the battery box 1002 of the chassis 20 such that energy from the module 1106 can transfer directly to the component when operated (e.g., energy from the module 1106 is directly transferred to an engine of the vehicle 10). In another embodiment, the module 1106 is coupled with a second module 1106 such that energy is transferred through the second module 1106 before reaching the component, or the module 1106 is coupled with a power distribution unit 1124 such that energy is transferred to the power distribution unit 1124 before reaching the component. The battery box 1002 of the chassis 20 may include system terminals 1112 to facilitate the transfer of energy from the module 1106 to the component of the vehicle 10. In some embodiments, a module 1106 includes a module terminal 1110 that contacts the system terminal 1112. The module terminal 1110 and the system terminal 1112 may comprise materials capable of conducting electricity and transferring energy. The system terminal 1112 may be electrically coupled to a component of the vehicle 10 or a power distribution unit 1124, or any combination thereof, such that the energy can reach the component to be operated.

According to an exemplary embodiment, at operation 1206 the chassis 20 receives supplemental energy. The supplemental energy may be energy from the same module 1106 or a different module 1106. In some embodiments, a battery 60 within the same module 1106 is recharged to receive supplemental energy from the same module 1106, or the battery 60 is replaced. A battery box 1002 of the chassis 20 may include a charge port 1122 such that the battery 60 disposed in the module 1106 can remain in the module 1106, and the module 1106 can remain in the battery box 1002, when the battery 60 is being recharged. The battery box 1002 may include a charge port 1122 configured to recharge a single module 1106 or a plurality of modules 1106. In some embodiments, a first charge port 1122 is configured to provide energy to a first module 1106, and a second charge port 1122 is configured to provide energy to a second module 1106. In another embodiment, the first charge port 1122 is configured to provide energy to the first and the second module 1106, and the second charge port 1122 is configured to provide energy to a third and a fourth module 1106. In another embodiment, one charge port 1122 is configured to supply energy to all modules 1106 disposed within the battery box 1002. In yet another embodiment, instead of recharging the battery 60 within the module 1106, a first battery 60 originally disposed in the module 1106 is replaced with a second battery 60. The module 1106 may be removed from the battery box 1002 such that the first battery 60 within the module 1106 may be accessed. The first battery 60 may be replaced by the second battery 60 and then the same module 1106 may be reinserted into the battery box 1002.

According to another exemplary embodiment, to receive the supplemental energy from a different module 1106, a first module 1106 disposed within the battery box 1002 is replaced with a second module 1106. The second module 1106 may include at least one battery 60 with energy ready to be transferred to a component of the vehicle 10. The battery box 1002 of the chassis 20 may be configured to incorporate any combination of recharging batteries 60, replacing batteries 60, and replacing modules 1106.

Structural Body

According to the exemplary embodiments shown in FIGS. 19-25, a vehicle, shown as vehicle 1500, is configured as an electric vehicle as described above. The vehicle 1500 may be similar to the vehicle 10 described herein, with similar features identified using like reference numerals, except as described herein or as apparent in the figures. The vehicle 1500 includes one or more electrical energy storage devices, shown as a battery housing 1502 and one or more batteries 60, positioned within middle section 24. The vehicle 1500 further includes one or more electromagnetic drive motors (not shown) coupled to the batteries 60 to propel the vehicle 1500. The vehicle 1500 may also be configured with the any of the application kits 80 described herein, provided the application kit 80 serves as the main structural component of vehicle 1500 by connecting front section 22 to rear section 26.

Figure 19:
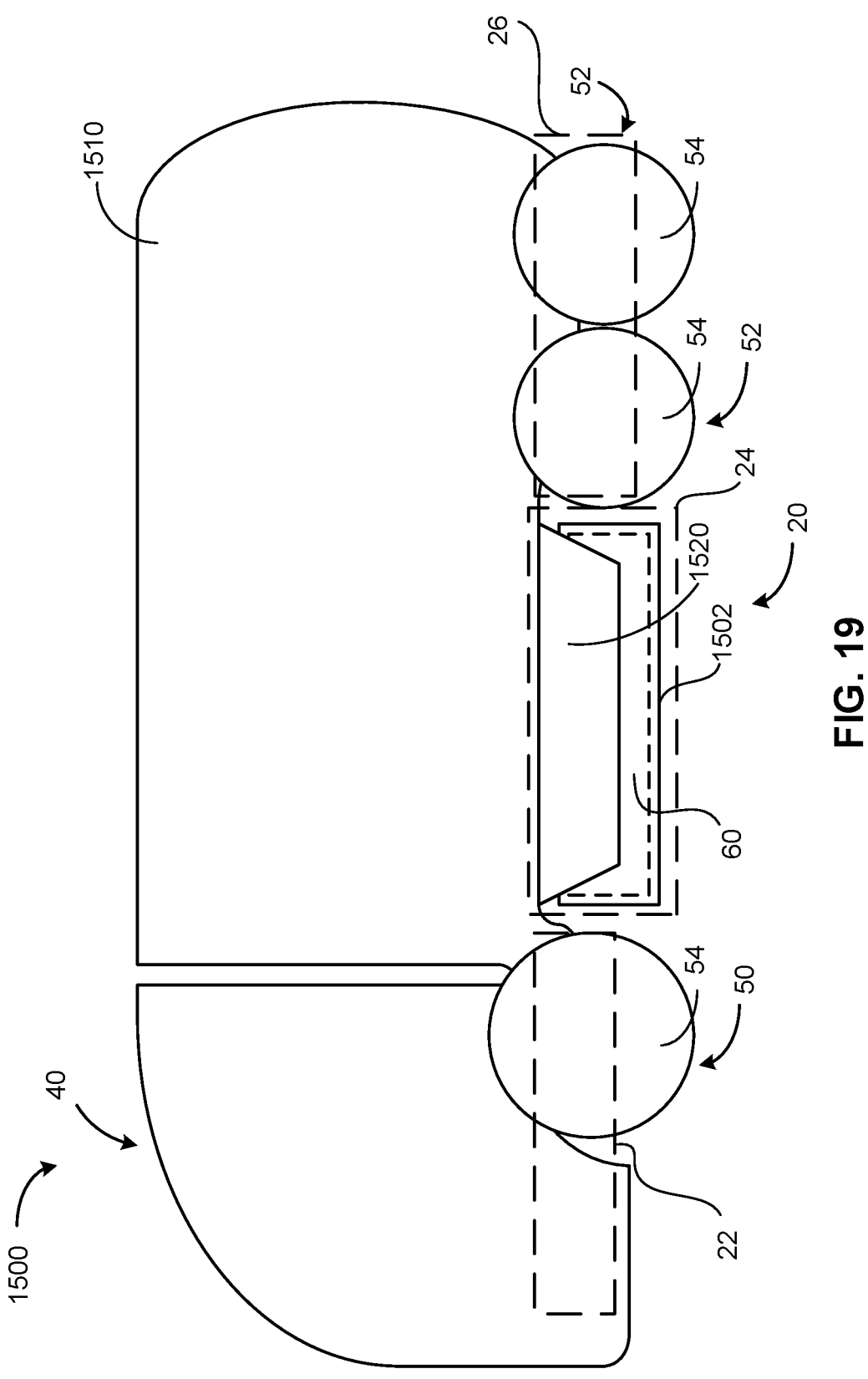
FIG. 19 is a left side view of the vehicle of FIG. 1 configured with a body connecting two subframes, according to an exemplary embodiment.

According to an exemplary embodiment shown in FIG. 19, the vehicle 1500 includes a chassis, shown as chassis 20, and a cab, shown as cab 40, connected to a structural body, shown as structural body 1510. In some embodiments the vehicle 1500 is the same as vehicle 10 above. In some embodiments, the cab 40 is coupled directly with the structural body 1510. In some embodiments, the cab 40 and the structural body 1510 are an integral, unitary piece. Still in other embodiments, the cab 40 is connected to the structural body 1510 indirectly, for example through the front section 22. The structural body 1510 may include frame rails, such as C-shaped frame rails, cross members, or other structural components and/or members to provide structural support to the vehicle 1500. For example, the structural body 1510 can act as a conventional frame member and can include frame portions, frame members, or frame rails, etc., necessary to provide structural support to the vehicle 1500 and its various components. In some embodiments, the structural body 1510 can provide structural support without frame rails. The structural body 1510 may also act as the application kit 80 and provide the vehicle 1500 with various configurations. In such embodiments, the structural body 1510 provides structural support to the vehicle 1500 as the vehicle's main stressed member and includes one or more implements, vehicle bodies, and/or other components for the variety of the application kits 80 described above. For example, when the vehicle 1500 is configured as a refuse truck as shown in FIGS. 3 and 19, structural body 1510 can include a refuse compartment and loading portion for facilitating the transport of refuse, while also providing structural support to the vehicle as the main stressed member between front and rear components. For another example, referring back to FIG. 5, the vehicle 10 is configured as a fire fighting vehicle, and the application kit 80 includes deployable stabilizers, storage compartments, the ladder assembly 308, etc. According to the present disclosure, in some embodiments the structural body 1510 includes the application kit 80 and also acts as main structural member for the fire fighting vehicle 300, connecting chassis components such as the front section 22 and the rear section 26 to provide longitudinal, lateral, and twisting strength to the fire fighting vehicle 300 as the main structural member. The application kit 80 as the main stressed member removes the stressed members traditionally found in the middle section 24 of the chassis 20 and allows the vehicle 300 to carry more components, such as a the batteries 60 for configuring the fire fighting vehicle 300 as an electrified vehicle.

Figure 20:
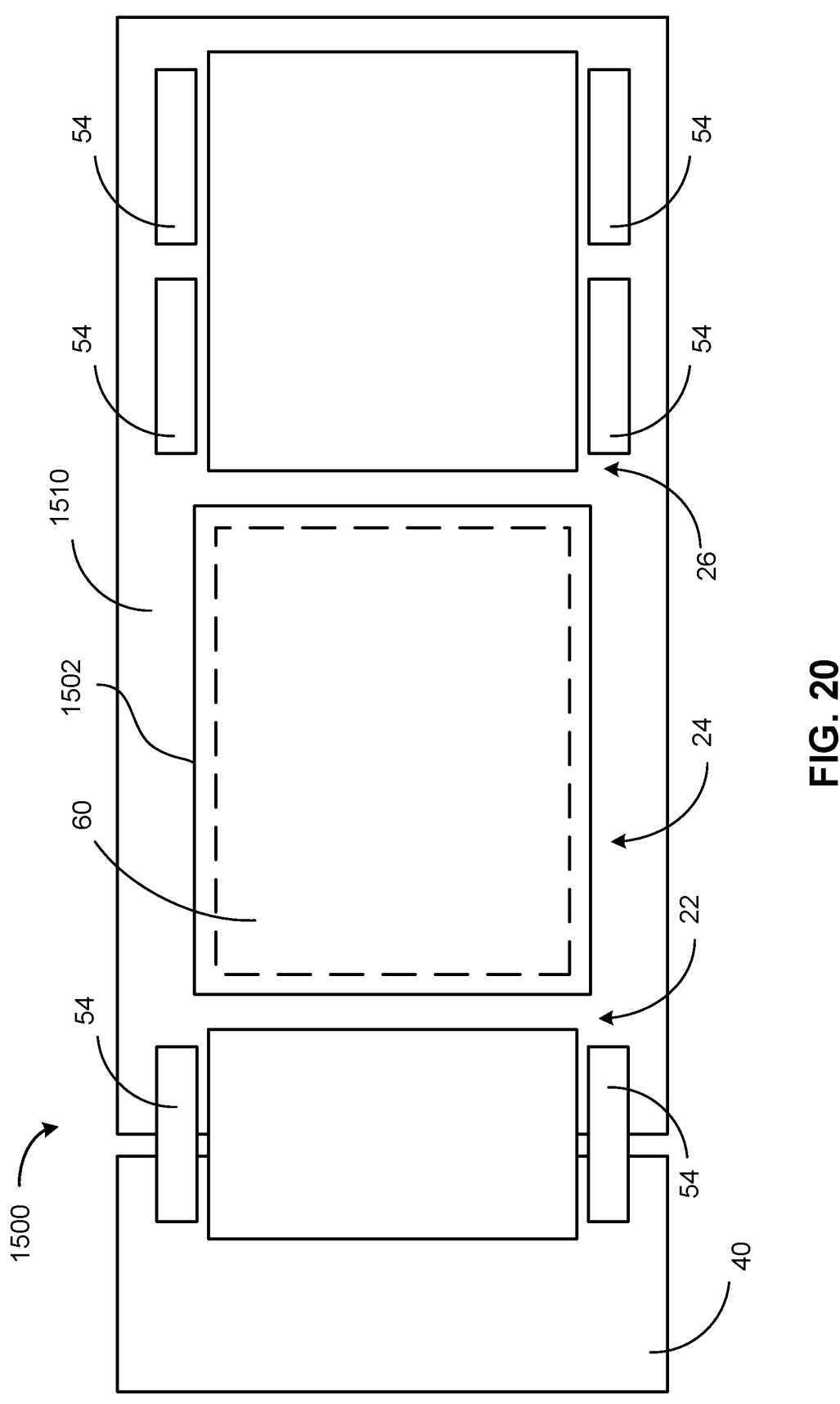
FIG. 20 is a bottom view of the vehicle of FIG. 19, according to an exemplary embodiment.

According to an exemplary embodiment shown in FIG. 20, the structural body 1510 is the main stressed member of the vehicle 1500. In some embodiments, the structural body 1510 is part of the chassis 20. For example, the structural body 1510 can be a part of middle section 24 and serve to connect front section 22 to rear section 26. In some embodiments, the structural body 1510 connects one or more components of the vehicle 1500. In some embodiments, the structural body 1510 is a stressed member that replaces a conventional frame. The structural body 1510 can eliminate redundant components and can reduce the weight of the vehicle 1500. The structural body 1510 may also minimize the space required on-vehicle for structural members.

Still referring to the exemplary embodiment shown in FIG. 20, the structural body 1510 connects components of the chassis 20 including the front section 22, one or more other components of the middle section 24 (shown to include the battery housing 1502 and the batteries 60), and the rear section 26. In some embodiments, the front section 22 and the rear section 26 are subframes as described above. Other components of the vehicle may connect to one or more of the structural body 1510, the front section 22, and the rear section 26, such as suspension components, drive train components, steering components, etc. The structural body 1510 connects the front section 22 and the rear section 26 and allows forces to be passed between the front section 22 and the rear section 26. For example, in a front-wheel drive configuration of vehicle 1500, driving force from the front tire assemblies 54 can be transferred to the rear section 26 via the structural body 1510. The structural body 1510 connects to the front section 22 and the rear section 26 by bolts or other fastening means (e.g., welds) to thereafter act as the main stressed member. In some embodiments, the structural body 1510 is integral with the front section 22 and the rear section 26 as a single stressed member. The structural body 1510 as described may replace a conventional frame/subframe arrangement as the structural member(s) between front and rear axles. The front section 22, the rear section 26, and the structural body 1510 act as the main structural member and transfer stresses within the vehicle 1500. The structural body 1510 may include the same mounting points in the same position as the frame in middle section 24 when middle section 24 serves as a frame member connecting the front section 22 and the rear section 26. The structural body 1510 thereafter replaces the middle section 24 as the connecting member between the front section 22 and the rear section 26.

The front section 22 and the rear section 26 may provide one or more hard-point mounting provisions for suspension components (e.g., steering arms, steering actuators, etc.), steering components (e.g., gas springs, dampeners, air springs, etc.), and/or power components (e.g., differentials, drive shafts, etc.) of the vehicle 1500. The front section 22 and rear section 26 may also include various other components of vehicle 10 described above. For example as shown in FIG. 1, the rear section 26 can include the drive motor 62, and as shown in FIG. 19 the front section 22 can include the front axle 50 and the rear section 26 can include one or more the rear axles 52. The front section 22 and the rear section 26 also include one or more tire assemblies 54 for propelling the vehicle 1500.

Figure 21:
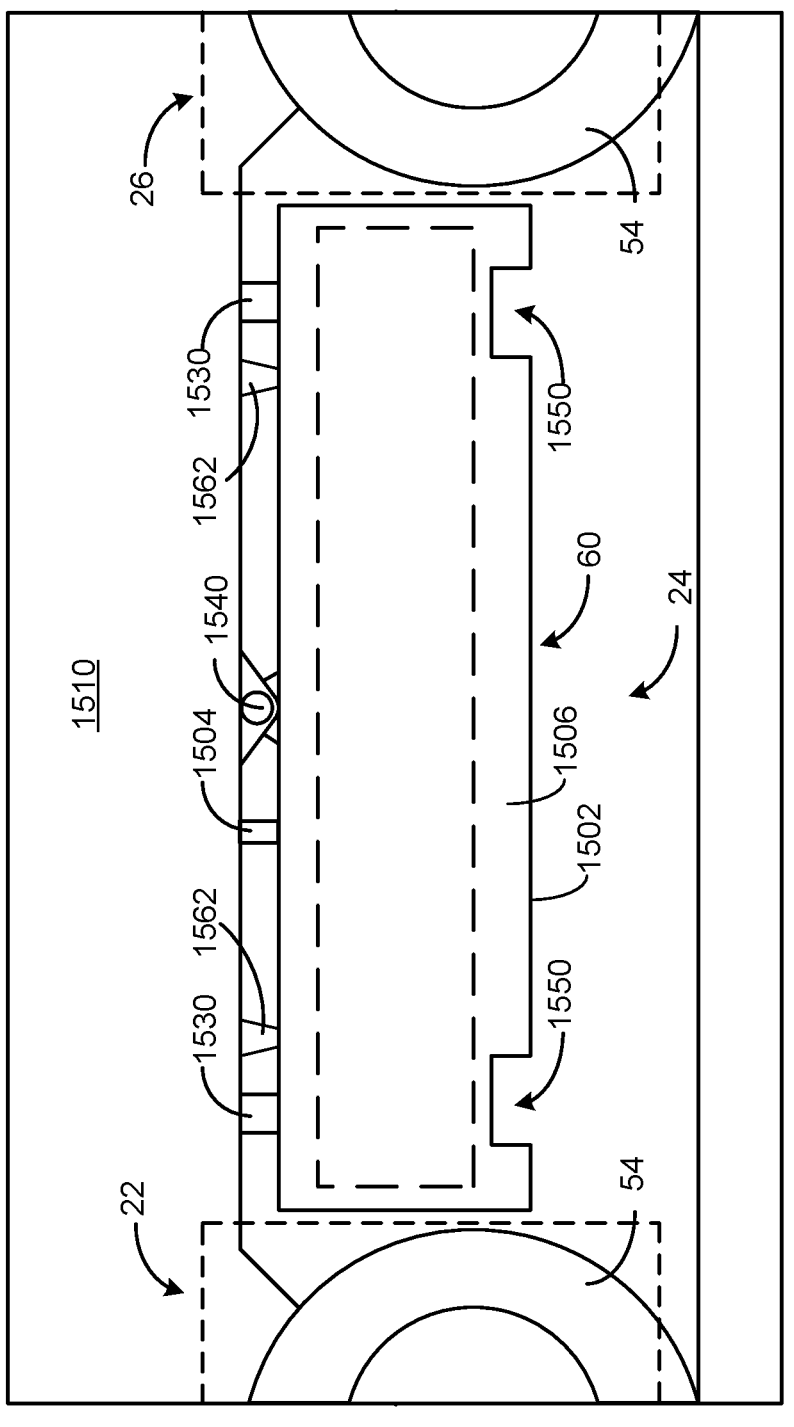
FIG. 21 is a side view of a battery housing of the vehicle of FIG. 19, according to an exemplary embodiment.

According to an exemplary embodiment shown in FIG. 21, the middle section 24 includes the space between the front section 22 and the rear section 26, where a vehicle's frame conventionally is found. According to the exemplary embodiments described herein, the structural body 1510 acts as the main structural member connecting the front section 22 and the rear section 26, as such the vehicle 1500 does not require the middle section 24 to be a structural component. Accordingly, the middle section 24 may house other vehicle components.

According to the exemplary embodiments shown in FIGS. 19-25, the middle section 24 houses an energy storage system for powering electric motors of vehicle 1500, shown as batteries 60 and battery housing 1502. The battery housing 1502 protects the batteries 60 from hazards including water, salt, dust, mud and debris. In some embodiments, the battery housing 1502 thermally isolates the batteries 60 from the outside environment. The batteries 60 may be contained in a tray or enclosure within the battery housing 1502. In some embodiments, the battery housing 1502 has integrated features for securing the batteries inside. For example, the tray may include indexed spaces for battery components. The batteries 60 may be removable from the battery housing 1502 for repair and/or replacement. In some embodiments, batteries 60 can be removed from battery housing 1502 while battery housing 1502 is coupled to structural body 1510. The batteries may be replaced and reinstalled without disconnecting the battery housing 1502 for more efficient servicing.

Referring back to the exemplary embodiment shown in FIG. 20, the battery housing 1502 is a rectangular assembly. In other embodiments, the battery housing 1502 may be another shape configured to fit within the available space between the front section 22 and the rear section 26 while maintaining the ability to access and remove the battery housing 1502 from the side of the vehicle 1500 between the front section 22 and the rear section 26. Still in other embodiments, the battery housing 1502 may extend beyond the front axles or the rear axles. The battery housing 1502 may include one or more selectively removable panels. For example a front panel, shown as front panel 1506, is removable and provides access to batteries 60 and other systems within battery housing 1502. In other embodiments, the battery housing 1502 includes one or more other access points (not shown) providing access to its interior and the batteries 60. The access points can be doors, latches, removable panels, etc., that can be sealed to prevent hazards from entering the interior of the battery housing 1502. The battery housing 1502 includes batteries 60 as well as associated systems and components such as cabling, thermal management systems, charging systems, communication systems, protection systems, etc. In some embodiments, the thermal management system includes an insulating layer that substantially surrounds the batteries 60 in the battery housing 1502. In some embodiments, the thermal management system can include a heating element and/or a cooling element. In some embodiments, the thermal management system includes one or more fluid channels in the battery housing 1502 for coolant to flow. In some embodiments, the thermal management system includes one or more heat exchangers, pumps, and radiators to heat and/or cool the coolant. In some embodiments, the thermal management system includes a controller. The controller can include a processing circuit including a processor and a memory. The processing circuit can be communicably connected to a communication interface to communicate with the one or more systems of the vehicle 1500 and/or systems external to the vehicle 1500. The processor can be implemented as a general purpose processor, an application specific integrated circuit ("ASIC"), one or more field programmable gate arrays ("FPGAs"), a group of processing components, or other suitable electronic processing components.

The memory (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory can be or include volatile memory or non-volatile memory. The memory can include database components, object code components, script components, or any other type of information structure for supporting the various activities and information structures described in the present application. According to some embodiments, the memory is communicably connected to the processor via the processing circuit and includes computer code for executing (e.g., by the processing circuit and/or the processor) one or more processes described herein.

In some embodiments, the controller for the thermal management system is implemented within a single computer (e.g., one server, one housing, etc.). In various other embodiments, the functionality of the controller can be distributed across multiple servers or computers (e.g., that can exist in distributed locations).

In some embodiments, a charging system includes a charging circuit, which can include one or more transformers, rectifiers, capacitors, or contactors. In some embodiments, the charging circuit is connected to a charging outlet of the vehicle to receive power from an external power source. In some embodiments, the charging circuit is electrically connected to the drive motor 62 to receive power, for example during recharging events where the vehicle uses the drive motor 62 to generate power. In some embodiments, the aforementioned systems are assembled with the batteries 60 and installed in the battery housing 1502 with the batteries 60. The battery housing 1502 contains the batteries 60 and related systems and may act as a single modular component readily installable and removable from the vehicle 1500.

In some embodiments, the batteries 60 can be a series of sections, battery strings, battery pods, battery cells, battery modules, or battery assemblies. The batteries 60 provide power for electric drive motors of the vehicle 1500 (e.g., drive motors 62 of vehicle 10) via one or more electrical connections. In some embodiments, the batteries 60 also provide power for the other components of the vehicle 1500 such as one or more implements included in the application kit 80. For example, the vehicle 1500 may include a vehicle power system (not shown) for distributing power throughout the vehicle 1500. The vehicle power system may electrically connect the electric motors of the vehicle 1500 to the battery housing 1502 and the batteries 60 via an electrical connection, shown as electrical connection 1504. The vehicle power system may include wires, processors, memory, and user input devices. While only one electrical connection is shown, multiple electrical connections be provided. The vehicle power system may be integrated into the one or more components that facilitate user operation of the vehicle 1500, and may integrate with user interface components in the cab 40 or elsewhere on the vehicle 1500. In some embodiments, the electrical connection 1504 can be a plug, an outlet, an electrical contact, a bus bar connection, or any other kind of connection suitable for electrically connecting the batteries 60 to the vehicle power system of the vehicle 1500 in a selectively detachable manner. In some embodiments, the electrical connection 1504 automatically connects the battery housing 1502 and the vehicle power system as the battery housing 1502 is installed. In other embodiments, the electrical connection 1504 is connected after the battery housing 1502 is installed in the vehicle 1500.

Referring back to the exemplary embodiment shown in FIG. 19, the battery housing 1502 is protected by impact barrier(s), shown as impact barriers 1520 on each side of the vehicle 1500. The impact barriers 1520 protect the middle section 24 of the vehicle 1500, including the battery housing 1502 and the batteries 60, from side impacts, road debris, and other dangers. IN some embodiments, the impact barriers 1520 are on opposing sides of the battery housing 1502. For example, an impact barrier 1520 can face a first side of the battery housing 1502 and an impact barrier 1520 can face a second side of the battery housing 1502 opposite the first side. The first and second sides can be lateral sides of the battery housing 1502, with one lateral side on a left side of the vehicle 1500 and a lateral side on the right side of the vehicle 1500.

The impact barriers 1520 may be selectively removable allowing access to battery housing 1502 and batteries 60 from the side of vehicle 1500. While shown in FIG. 19 as a plate, in some embodiments, the impact barriers 1520 can rails, bumpers, and/or other arrangements configured to protect the middle section 24. The impact barriers 1520 may be attached with latches, bolts, hinges, sliders, or other mechanisms that facilitate sliding, rotating, or removing the impact barriers 1520 to allow access to the battery housing 1502.

According to the exemplary embodiment shown in FIG. 21, the impact barriers 1520 can be removed to provide access to the battery housing 1502. In some embodiments, the battery housing 1502 may selectively couple and decouple from the structural body 1510. In some embodiments, the battery housing 1502 is permanently coupled to the structural body 1510 and instead the batteries 60 may selectively couple and decouple from the battery housing 1502. In such embodiments, the batteries 60 include the same connections and features of a selectively removable battery housing 1502 as described herein. In some embodiments, the battery housing 1502 can include integrated fork lift guides, shown as lift guides 1550 for facilitating the installation and removal of the battery housing 1502 from the vehicle 1500. While shown as lift guides 1550, other embodiments of vehicle 1500 may include lift points, slots, tracks, etc.

As shown in FIG. 21, the structural body 1510 includes one or more installation guides, shown as guide pins 1562, for properly positioning the battery housing 1502 in relation to the structural body 1510 during installation. In some embodiments, the guide pins 1562 correspond to exclusions, indentations, and/or corresponding receiving portions in battery housing 1502 that receive the guide pins 1562. While shown as guide pins 1562, the guide pins 1562 may be wedges, indents, indexes, etc., configured to extend from the structural body 1510 and interface with the battery housing 1502. In some embodiments, the guide pins 1562 position the battery housing 1502 appropriately so that the one or more mounting points of the battery housing 1502 align with corresponding mounting points on structural body 1510. The guide pins 1562 may position the battery housing 1502 both in the proper longitudinal and lateral position, as well as in a parallel plane to the mounting points of structural body 1510. As discussed herein the guide pins 1562 may also provide engagement limits or stops for translational and/or rotational movement of the battery housing 1502 relative to the structural body 1510.

Figures 22, 23:
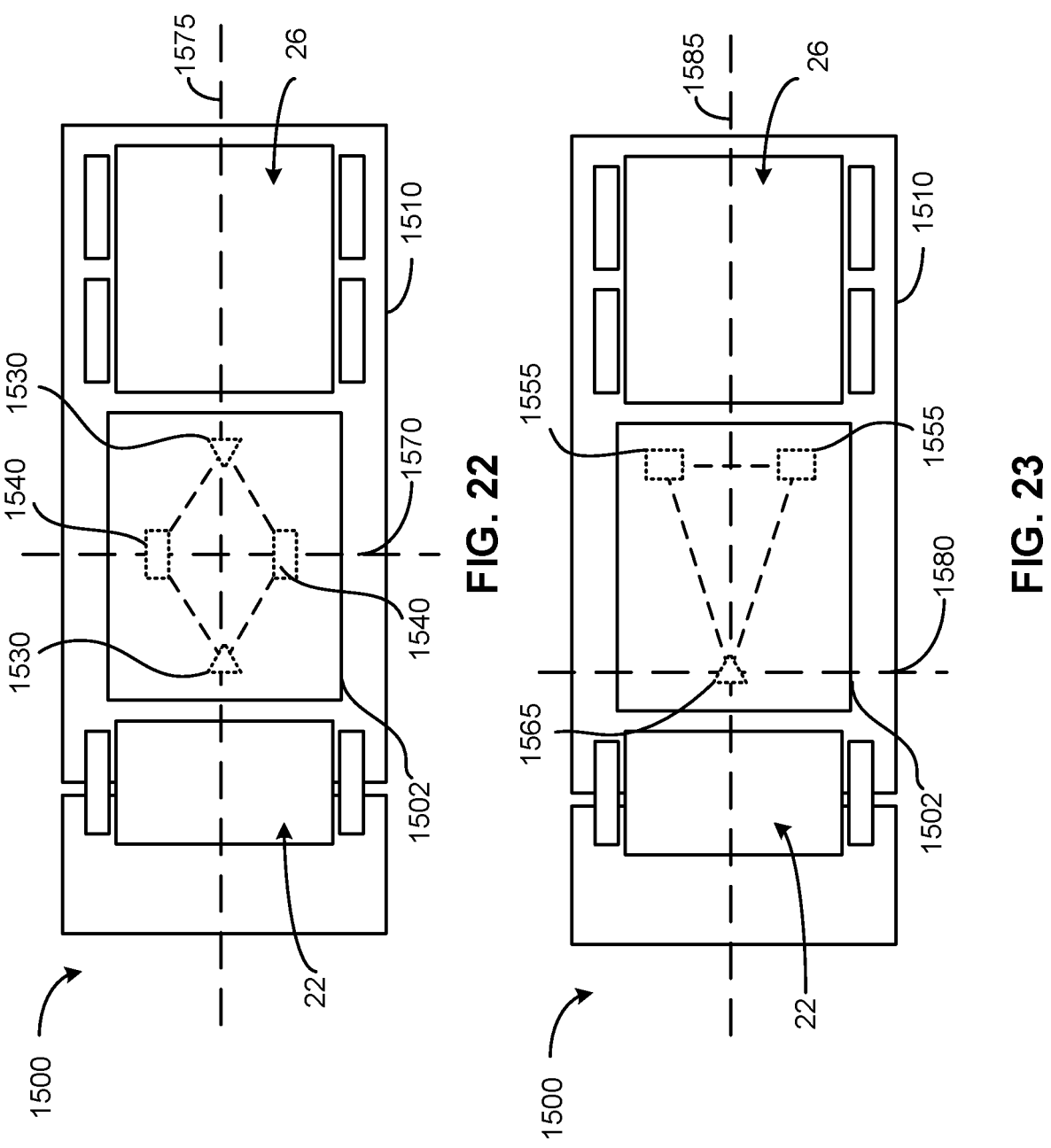
FIG. 22 is a bottom view of the vehicle of FIG. 19 configured with a three-point mounting system, according to an exemplary embodiment.
FIG. 23 is a bottom view of the vehicle of FIG. 19 configured with a four-point mounting system, according to an exemplary embodiment.

Still referring to the exemplary embodiment shown in FIG. 21, one or more mounting points, shown as mounting points 1530 and center mounting points 1540, can couple the battery housing 1502 to the structural body 1510. In some embodiments, the mounting points 1530 and center mounting points 1540, either individually or as a group, provide torsional and bending isolation of the battery housing 1502 from the structural body 1510. The isolation protects the battery housing 1502 and the batteries 60 as the structural body 1510 is stressed, during which it may experience some deformation. In some embodiments, the torsional and bending isolation is provided by springs, dampers, etc. For example, at least a portion of the mounting points 1530 and center mounting points 1540 can be made of rubber to dampen forces exchanged between the structural body 1510 and the battery housing 1502. As shown in FIGS. 21 and 22, the battery housing 1502 is mounted to the structural body 1510 using a four-point mounting system including mounting points 1530 and center mounting point(s) 1540.

According to an exemplary embodiment shown in FIG. 22, as viewed from below the vehicle 1500, the center mounting points 1540 are pivot mounts that allow the battery housing 1502 to rotate around the vehicle 1500's lateral axis, shown as lateral axis 1570. The mounting points 1530 are also pivot mounts that allow the battery housing 1502 to rotate around the vehicle 1500's longitudinal axis, shown as longitudinal axis 1575.

According to an exemplary embodiment shown in FIG. 23, a three-point mounting system, shown as fixed points 1555 and pivoting mount 1565, connects the battery housing 1502 to the structural body 1510. The two fixed points 1555 are located near the rear of battery housing 1502 and the single pivoting mount 1565 is located near the front of battery housing 1502. The three-point mounting system may be reversed such that the fixed points 1555 are nearer the front of the vehicle 1500. The pivoting mount 1565 allows the battery housing 1502 to rotate around an axis parallel to the longitudinal axis of the vehicle 1500, shown as longitudinal axis 1585, as well as an axis parallel to the lateral axis of the vehicle, shown as lateral axis 1580. While the three-point and four-point mounting systems are shown, in FIGS. 12 and 13, respectively, it should be understood that other mounting systems and arrangements may be used to couple the battery housing 1502 and the batteries 60 to the structural body 1510 while isolating the battery housing 1502 from any torsional or bending forces. The mounting points 1530, center mounting points 1540, fixed points 1555, and pivoting mount 1565 may additionally isolate battery housing 1502 from any vibrational forces in the structural body 1510.

As shown in FIGS. 22 and 23, the battery housing 1502 may extend the width of the vehicle 1500 along a lateral axis, such as lateral axis 1570, and along the longitudinal axis of the vehicle 1500, such as longitudinal axis 1575. As defined herein the width of the vehicle 1500 is the distance between the outermost surfaces of tire assemblies 54 along the lateral axis of the vehicle 1500. In some embodiments, the battery housing 1502 extends between the front axle 50 and the rear axle(s) 52. In some embodiments battery housing 1502 extends beyond front axle 50 and/or rear axle(s) 52. The length, width, and height of battery housing 1502 may vary depending on the desired or required size of the batteries 60 and of vehicle 1500.

Figures 24, 25:
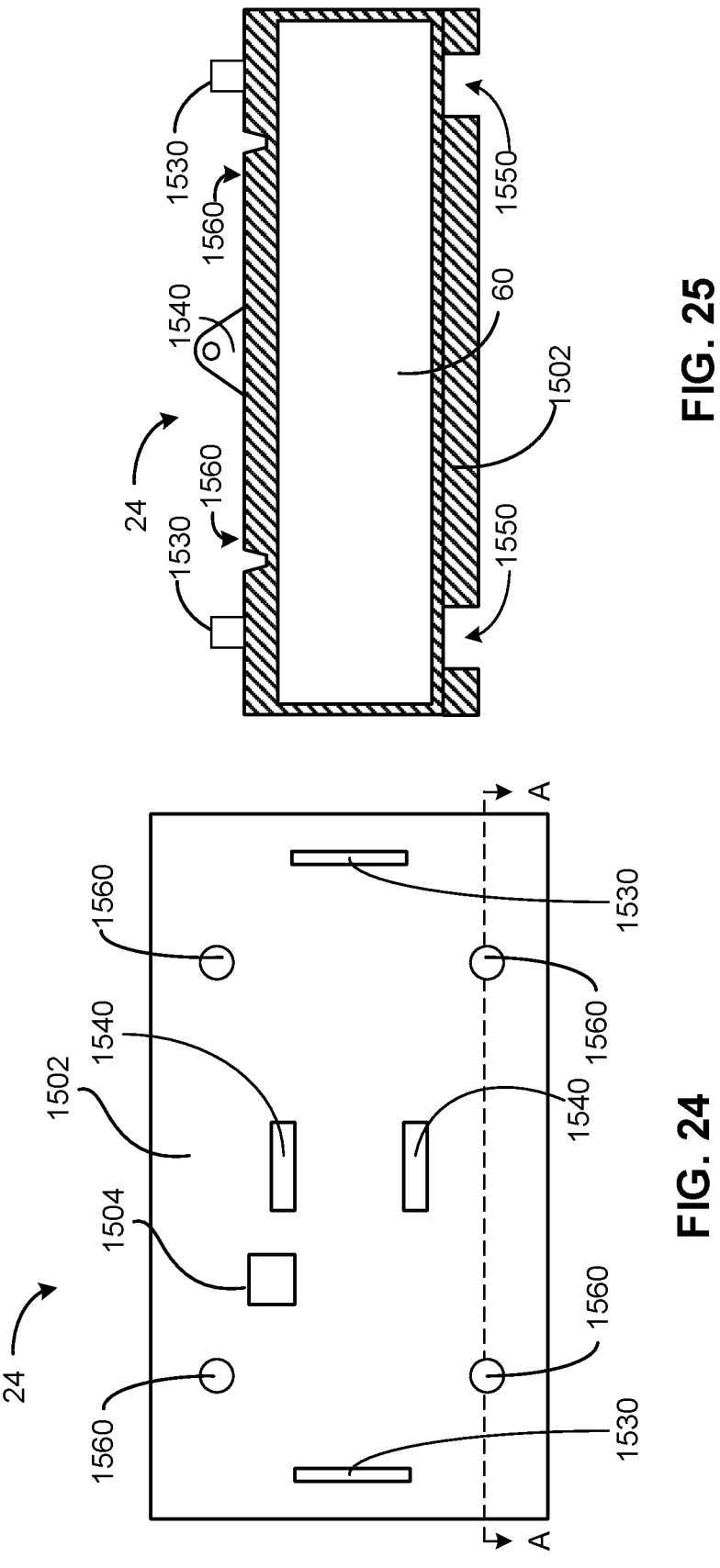
FIG. 24 is a top view of a battery housing of the vehicle of FIG. 19, according to an exemplary embodiment.
FIG. 25 is a cross-sectional view of the battery housing of FIG. 24 taken along line A-A.

According to an exemplary embodiment in FIG. 24, the middle section 24 includes the battery housing 1502 and the electrical connection 1504. The battery housing 1502 includes the installation guides, shown as installation guides 1560, that receive the guide pins 1562 in order to facilitate installation and proper positioning of mounting points with the structural body 1510, shown as the mounting points 1530 and the center mounting points 1540. As shown, the guide pins 1562 are near each corner of the battery housing 1502, though it should be understood the guide pins 1562 can be positioned anywhere between the structural body 1510 and the battery housing 1502. In some embodiments, the guide pins 1562 support the battery housing 1502 in both the x and y planes parallel to the plane of the vehicle 1500. Cross-section A is indicated through the middle of the battery housing 1502 and is shown in FIG. 25.

According to the exemplary embodiment shown in FIG. 25, the installation guides 1560 are tapered exclusions in the battery housing 1502 to receive corresponding the guide pins 1562. While shown on the top side of the battery housing 1502, the installation guides 1560 and/or other types of installation guides may be located on other faces of the battery housing 1502, such as the sides. While four installation guides 1560 are shown, any number of installation guides, indexes, alignment pins, etc., can be used to align the battery housing 1502 with the mounting points on the structural body 1510.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field pro- grammable gate array (FPGA), or other programmable logic device, discrete gate or transistor logic, discrete hardware components, or any combination thereof designed to per- form the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk stor- age) for storing data and/or computer code for completing or facilitating the various processes, layers and modules described in the present disclosure. The memory may be or include volatile memory or non-volatile memory, and may include database components, object code components, script components, or any other type of information struc- ture for supporting the various activities and information structures described in the present disclosure. According to an exemplary embodiment, the memory is communicably connected to the processor via a processing circuit and includes computer code for executing (e.g., by the process- ing circuit or the processor) the one or more processes described herein.

The present disclosure contemplates methods, systems and program products on any machine-readable media for accomplishing various operations. The embodiments of the present disclosure may be implemented using existing com- puter processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-execut- able instructions or data structures and which can be accessed by a general purpose or special purpose computer or other machine with a processor. Combinations of the above are also included within the scope of machine- readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrange- ment of the vehicle 10 as shown in the various exemplary embodiments is illustrative only. Additionally, any element disclosed in one embodiment may be incorporated or uti- lized with any other embodiment disclosed herein. For example, the cab 40 of the exemplary embodiment shown in at least FIG. 4 may be incorporated into the refuse vehicle 100 of the exemplary embodiment shown in at least FIG. 3. Although only one example of an element from one embodi- ment that can be incorporated or utilized in another embodi- ment has been described above, it should be appreciated that other elements of the various embodiments may be incor- porated or utilized with any of the other embodiments disclosed herein.

What is claimed is:

1. An electrified vehicle, comprising:
   a chassis configured to support a tractive element, the chassis including a front axle, a rear axle, and a battery box, the battery box comprising:
   a first portion disposed between the front axle and the rear axle and defining a first depth;
   a second portion disposed above the rear axle and defining a second depth, the first depth greater than the second depth;
   a shell defining an internal cavity, the first portion, and the second portion; and
   a power distribution unit including a controller;
   a body supported by the chassis; and
   a cab supported by the chassis,
   wherein the battery box is configured to:
   receive a module, the module comprising a battery and a module terminal; and
   transfer energy from the module to a plurality of components of the electrified vehicle, the internal cavity of the battery box comprising a system ter- minal configured to contact the module terminal of the module to facilitate the transfer of the energy from the module to the power distribution unit,
   wherein the controller of the power distribution unit comprises at least one processor coupled with at least one memory device storing instructions that, when executed by the at least one processor, cause the controller to:
   receive the energy from the module, and
   selectively direct the energy to at least one of the plurality of components of the electrified vehicle to be operated.

2. The electrified vehicle of claim 1, further comprising a module protection layer disposed within the shell of the battery box, the module protection layer disposed along at least a part of an interior wall of the shell to protect the module from external forces and outside ambient conditions.

3. The electrified vehicle of claim 2, wherein the internal cavity of the battery box comprises:
   a wall that divides the internal cavity into a first compart- ment and a second compartment, the wall configured to facilitate positioning of the module in the internal cavity of the battery box.

4. The electrified vehicle of claim 3, wherein the battery box further comprises a charge port configured to receive an electrical input from an external power source and provide the electrical input to the module to charge the battery of the module when the module is disposed within the internal cavity of the battery box.

5. The electrified vehicle of claim 1, wherein the battery box further comprises a thermal management system comprising a temperature sensor and at least one of a fan or a heating element, the thermal management system configured to control a temperature within the internal cavity of the battery box.

6. The electrified vehicle of claim 5, wherein the battery box comprises the fan and the heating element and the thermal management system is configured to control the temperature within the internal cavity of the battery box by:

receiving data indicative of a temperature within the internal cavity of the battery box from the temperature sensor; and activating the fan based on the temperature being greater than a first threshold; or activating the heating element based on the temperature being less than a second threshold.

7. The electrified vehicle of claim 1, wherein the first portion extends a full width of the electrified vehicle and the second portion extends from the first portion toward a rear end of the electrified vehicle such that the second portion of the battery box is disposed above a rear axle of the electrified vehicle.

8. The electrified vehicle of claim 7, wherein the chassis further comprises a subframe, the subframe comprising at least one of a front subframe and a rear subframe, wherein the subframe is coupled to the battery box.

9. The electrified vehicle of claim 1, wherein the module further comprises a plurality of internal components, wherein the plurality of internal components include at least one of the battery, associated cabling, a thermal management system, and a communication system.

10. The electrified vehicle of claim 1, wherein the first portion of the battery box comprises a first width and the second portion of the battery box comprises a second width, the first width different from the second width.

11. The electrified vehicle of claim 10, wherein the first width is greater than the second width.

12. The electrified vehicle of claim 1, wherein the internal cavity of the battery box is configured to receive a plurality of modules, wherein the plurality of modules comprises a first module and a second module.

13. The electrified vehicle of claim 12, wherein the first module and the second module are electrically coupled with the power distribution unit, wherein the power distribution unit is configured to selectively direct the energy from the first module and the second module to the plurality of components of the electrified vehicle.

14. The electrified vehicle of claim 13, wherein the plurality of components of the electrified vehicle are operable when one of the first module and the second module is missing or out of energy.

15. An electrified vehicle, comprising:

a chassis configured to support a tractive element, the chassis including a front axle and a rear axle;

a body supported by the chassis;

a cab supported by the chassis;

a battery box coupled to the chassis and configured to receive a module, the battery box comprising:

a power distribution unit including a controller, a first portion disposed between the front axle and the rear axle, the first portion comprising a first depth and a first width, and a second portion disposed above the rear axle, the second portion comprising a second depth and a second width, the first depth greater than the second depth, and the first width different from the second width; and a plurality of components configured to receive power from the power distribution unit, wherein the controller of the power distribution unit comprises at least one processor coupled with at least one memory device storing instructions thereon, that when executed by the at least one processor, cause the controller to:

receive energy from the module, and selectively direct the energy to at least one of the plurality of components of the electrified vehicle to be operated.

16. The electrified vehicle of claim 15, further comprising a front axle and a rear axle, wherein the first portion is disposed between the front axle and the rear axle and the second portion is disposed above the rear axle.

17. The electrified vehicle of claim 15, wherein the first width is greater than the second width.

18. The electrified vehicle of claim 15, further comprising a plurality of modules, the plurality of modules comprising a first module and a second module, the first module to be disposed in the first portion of the battery box and the second module to be disposed in the second portion of the battery box, the first module having a first module height based, at least partially, on the first depth and the second module having a second module height based, at least partially, on the second depth.

19. A method of providing energy to a plurality of components of a vehicle, comprising:

receiving, by a chassis of the vehicle, a module comprising at least one electrical energy storage device configured to store the energy and a module terminal, the chassis configured to support a tractive element, the chassis comprising a front axle, a rear axle, and a battery box, the battery box comprising:

a system terminal, a first portion disposed between the front axle and the rear axle and defining a first depth, a second portion disposed above the rear axle and defining a second depth, the first depth greater than the second depth, and a power distribution unit; and transferring, by the chassis of the vehicle, the energy from the at least one electrical energy storage device of the module to the plurality of components of the vehicle, wherein the energy transfers from the module to the power distribution unit via the module terminal and to the plurality of components via the power distribution unit and the system terminal of the battery box, the power distribution unit selectively directing the energy to at least one of the plurality of components of the vehicle to be operated.

20. The method of claim 19, further comprising receiving, by the chassis of the vehicle, supplemental energy comprising at least one of charging the at least one electrical energy storage device, replacing the at least one electrical energy storage device, and replacing the module.

* * * * *